(12) United States Patent
Choi et al.

(10) Patent No.: US 11,575,962 B2
(45) Date of Patent: Feb. 7, 2023

(54) ELECTRONIC DEVICE AND CONTENT RECOGNITION INFORMATION ACQUISITION THEREFOR

(71) Applicant: SAMSUNG ELECTRONICS CO., LTD., Suwon-si (KR)

(72) Inventors: Hyunsoo Choi, Suwon-si (KR); Minsoo Kim, Suwon-si (KR); Sungjin Kim, Suwon-si (KR); Younguk Kim, Suwon-si (KR); Ilkoo Kim, Suwon-si (KR); Hyunhan Kim, Suwon-si (KR); Jiwoong Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 64 days.

(21) Appl. No.: 17/053,289

(22) PCT Filed: Mar. 21, 2019

(86) PCT No.: PCT/KR2019/003304
§ 371 (c)(1),
(2) Date: Nov. 5, 2020

(87) PCT Pub. No.: WO2019/225851
PCT Pub. Date: Nov. 28, 2019

(65) Prior Publication Data
US 2021/0195283 A1    Jun. 24, 2021

(30) Foreign Application Priority Data

May 21, 2018 (KR) .................. 10-2018-0057586
Dec. 7, 2018 (KR) .................. 10-2018-0157354

(51) Int. Cl.
*H04N 21/44* (2011.01)
*H04N 21/442* (2011.01)
(Continued)

(52) U.S. Cl.
CPC ..... *H04N 21/44008* (2013.01); *H04N 21/442* (2013.01); *H04N 21/4722* (2013.01); *H04N 21/8133* (2013.01); *H04N 21/84* (2013.01)

(58) Field of Classification Search
CPC ........... H04N 21/44008; H04N 21/442; H04N 21/4722; H04N 21/8133; H04N 21/84;
(Continued)

(56) References Cited

U.S. PATENT DOCUMENTS 6,636,609 B1    10/2003    Ha et al.
7,266,287 B2    9/2007     Zhang
(Continued)

FOREIGN PATENT DOCUMENTS

CN    103002328 A    3/2013
CN    104504155 A    4/2015
(Continued)

OTHER PUBLICATIONS

Notice of Allowance dated Jul. 29, 2021 issued by the United States Patent and Trademark Office in U.S. Appl. No. 16/431,886.
(Continued)

*Primary Examiner* — Kunal Langhnoja
(74) *Attorney, Agent, or Firm* — Sughrue Mion, PLLC

(57) ABSTRACT

Disclosed are a method for recognizing an image by an electronic device and a configuration of the electronic device for same. The method for recognizing an image by an electronic device of the present disclosure comprises the steps of: capturing an image of content; acquiring, form a server, content recognition information matching a recognized text by recognizing the text from a text area, if the text area is identified in the captured image, and acquiring, from the server, content recognition information matching an extracted fingerprint by extracting the fingerprint from the captured image, if the text area is not identified in the
(Continued)

captured image; and storing at least one of the content recognition information matching the acquired text and the content recognition information matching the fingerprint.

13 Claims, 15 Drawing Sheets

(51) Int. Cl.
　　　*H04N 21/4722*　　　(2011.01)
　　　*H04N 21/81*　　　　(2011.01)
　　　*H04N 21/84*　　　　(2011.01)
(58) Field of Classification Search
　　　CPC ......... H04N 21/4622; H04N 21/47815; H04N 21/6582; H04N 21/812; H04N 21/2407; H04N 21/44204; H04N 21/4828; H04H 60/37; H04H 60/59
　　　See application file for complete search history.

(56) References Cited

U.S. PATENT DOCUMENTS

| | | |
|---|---|---|
| 7,765,564 B2 | 7/2010 | Deng |
| 7,903,098 B2 | 3/2011 | Tokimoto |
| 7,975,285 B2 | 7/2011 | Takegoshi |
| 8,019,162 B2 | 9/2011 | Zhang et al. |
| 8,819,717 B2 | 8/2014 | Deng |
| 8,843,990 B1 | 9/2014 | Haberman et al. |
| 8,856,817 B2 | 10/2014 | Sinha et al. |
| 9,146,990 B2 | 9/2015 | Scherf et al. |
| 9,301,008 B2 | 3/2016 | Park et al. |
| 9,319,740 B2 | 4/2016 | Sinha et al. |
| 9,473,820 B2 | 10/2016 | Mallinson |
| 9,495,451 B2 | 11/2016 | Harron |
| 9,565,456 B2 | 2/2017 | Helferty et al. |
| 9,576,473 B2 | 2/2017 | Navin et al. |
| 10,045,073 B2 | 8/2018 | Seo et al. |
| 10,219,011 B2 | 2/2019 | Jung et al. |
| 10,334,321 B2 | 6/2019 | Kim et al. |
| 10,623,798 B2 | 4/2020 | Kim |
| 11,218,764 B2 | 1/2022 | Koh |
| 2005/0154952 A1 | 7/2005 | Kawada et al. |
| 2007/0061833 A1 | 3/2007 | Deng |
| 2007/0209055 A1 | 9/2007 | Koga et al. |
| 2007/0212030 A1 | 9/2007 | Koga et al. |
| 2008/0082995 A1 | 4/2008 | Tanaka et al. |
| 2008/0127253 A1 | 5/2008 | Zhang et al. |
| 2009/0066845 A1 | 3/2009 | Okuda |
| 2010/0053452 A1 | 3/2010 | Abe et al. |
| 2010/0123823 A1 | 5/2010 | Kim |
| 2011/0275311 A1 | 11/2011 | Buehler et al. |
| 2011/0276882 A1 | 11/2011 | Buehler et al. |
| 2012/0117584 A1 | 5/2012 | Gordon |
| 2012/0324499 A1 | 12/2012 | Deng |
| 2013/0218735 A1 | 8/2013 | Murray |
| 2013/0331971 A1 | 12/2013 | Bida et al. |
| 2014/0082646 A1 | 3/2014 | Sandland |
| 2014/0101683 A1 | 4/2014 | Arshavski et al. |
| 2014/0181853 A1 | 6/2014 | Dureau et al. |
| 2014/0230002 A1 | 8/2014 | Kitazato |
| 2014/0282668 A1* | 9/2014 | Gava ............... H04N 21/44213 725/19 |
| 2015/0026718 A1 | 1/2015 | Seyller |
| 2015/0089535 A1 | 3/2015 | Moon et al. |
| 2015/0334459 A1 | 11/2015 | Oh et al. |
| 2016/0073047 A1 | 3/2016 | Yabu |
| 2016/0112768 A1 | 4/2016 | Kim et al. |
| 2016/0286263 A1 | 9/2016 | Jung et al. |
| 2016/0316261 A1 | 10/2016 | Koshevoy |
| 2016/0316262 A1 | 10/2016 | Chen |
| 2017/0171609 A1 | 6/2017 | Koh |
| 2017/0201793 A1 | 7/2017 | Pereira et al. |
| 2017/0208353 A1 | 7/2017 | Kim et al. |
| 2017/0238065 A1 | 8/2017 | Jang et al. |
| 2017/0295400 A1 | 10/2017 | Jang et al. |
| 2018/0035149 A1 | 2/2018 | Choi et al. |
| 2018/0063572 A1 | 3/2018 | Smus |
| 2018/0103285 A1 | 4/2018 | Kim |
| 2018/0167694 A1 | 6/2018 | Kim et al. |
| 2019/0050666 A1* | 2/2019 | Kim ...................... G06V 20/62 |
| 2019/0138911 A1 | 5/2019 | Kadochnikov et al. |
| 2020/0026797 A1 | 1/2020 | Weinstein |
| 2020/0133643 A1 | 4/2020 | Hou |
| 2020/0310952 A1 | 10/2020 | Shanl et al. |
| 2021/0092474 A1 | 3/2021 | Koh |

FOREIGN PATENT DOCUMENTS

| | | | |
|---|---|---|---|
| CN | 107920278 A | 4/2018 | |
| EP | 1 653 381 A2 | 5/2006 | |
| EP | 2 608 107 A2 | 6/2013 | |
| EP | 2 763 427 A1 | 8/2014 | |
| EP | 2763427 A1 * | 8/2014 | ............ G06Q 50/00 |
| EP | 2 916 554 A1 | 9/2015 | |
| EP | 3 334 172 A1 | 6/2018 | |
| EP | 3 340 639 A1 | 6/2018 | |
| JP | 4967998 B2 | 7/2012 | |
| JP | 5277582 B2 | 8/2013 | |
| JP | 2015-162865 A | 9/2015 | |
| KR | 10-1237229 B1 | 2/2013 | |
| KR | 10-2013-0124911 A | 11/2013 | |
| KR | 10-1377849 B1 | 3/2014 | |
| KR | 10-2015-0030185 A | 3/2015 | |
| KR | 10-2016-0053549 A | 5/2016 | |
| KR | 10-1644956 B1 | 8/2016 | |
| KR | 10-2016-0115264 A | 10/2016 | |
| KR | 10-1747776 B1 | 6/2017 | |
| KR | 10-2017-0101076 A | 9/2017 | |
| KR | 10-2018-0014657 A | 2/2018 | |
| KR | 10-2018-0065592 A | 6/2018 | |
| KR | 10-1873364 B1 | 8/2018 | |
| WO | 2005/032145 A1 | 4/2005 | |
| WO | 2013/040533 A1 | 3/2013 | |
| WO | 2014/082353 A1 | 6/2014 | |
| WO | 2017/146454 A1 | 8/2017 | |
| WO | WO-2017146454 A1 * | 8/2017 | ............ G06F 3/167 |
| WO | 2018/066938 A1 | 4/2018 | |

OTHER PUBLICATIONS

Advisory Action dated Aug. 10, 2021 issued by the United States Patent and Trademark Office in U.S. Appl. No. 16/690,544.
Notice of Allowance dated Sep. 29, 2021 issued by the United States Patent and Trademark Office in U.S. Appl. No. 16/690,544.
Communication dated May 5, 2021 by the United States Patent and Trademark Office in counterpart U.S. Appl. No. 16/690,544.
Communication dated May 25, 2021 by the European Patent Office in counterpart European Patent Application No. 19210566.6.
Communication dated Jul. 9, 2021 by the European Patent Office in counterpart European Patent Application No. 19210566.6.
Communication dated Jul. 13, 2021 by the European Patent Office in counterpart European Patent Application No. 19210566.6.
Communication dated Jan. 29, 2021 by the United States Patent and Trademark Office in corresponding U.S. Appl. No. 16/431,886.
Communication dated Feb. 4, 2021 by the European Patent Office in corresponding European Application No. 19827383.1.
International Search Report and Written Opinion (PCT/ISA/210 and PCT/ISA/237) dated Jul. 10, 2019 issued by the International Searching Authority for International Application No. PCT/KR2019/003304.
Communication dated Sep. 19, 2019, issued by the International Searching for International Application No. PCT/KR2019/006495 (PCT/ISA/210 and PCT/ISA/237).
Communication dated Oct. 1, 2020, issued by the US Patent Office for U.S. Appl. No. 16/431,886.
Communication dated Feb. 12, 2020, issued by the European Patent Office for European Patent Application No. 19210566.6.
Communication dated Oct. 2, 2020, issued by the US Patent Office for U.S. Appl. No. 16/690,544.

(56) References Cited

OTHER PUBLICATIONS

Communication dated Sep. 29, 2020, issued by the European Patent Office for European Patent Application No. 19806480.0.
Montagnuolo et al., "Automatic Genre Classification of TV Programmes Using Gaussian Mixture Models and Neural Networks," 18th International Workshop on Database and Expert Systems Applications, IEEE Computer Society, 2007, pp. 99-103.
Communication dated Dec. 15, 2021, issued by the China National Intellectual Property Administration in counterpart Chinese Application No. 201980034329.0.
Guo et al., "Research on Intelligent Image Duplication Checking and Information Extraction in Networks Teaching Platform Based on Media Computing," Journal of Educational Technology, vol. 15, No. 11, Nov. 2016, total 4 pages.
Communication dated Apr. 4, 2022 by the European Patent Office in counterpart European Patent Application No. 19806480.0.
Communication dated Apr. 26, 2022 by the State Intellectual Property Office of P.R. China in counterpart Chinese Patent Application No. 201980041076.X.
Communication dated Jun. 15, 2022 by the State Intellectual Property Office of P.R. China in counterpart Chinese Patent Application No. 201980034329.0.
Communication dated Oct. 11, 2022 by the European Patent Office in European Patent Application No. 19827383.1.
Y. Li and C. Dorai, "Instructional Video Content Analysis Using Audio Information", IEEE Transactions on Audio, Speech, and Language Processing, vol. 14, No. 6, Nov. 2006, (11 total pages).
Communication dated Dec. 1, 2022 by the Korean Patent Office in counterpart Korean Patent Application No. 10-2018-0073000.
Communication dated Dec. 19, 2022 by the Korean Patent Office in counterpart Korean Patent Application No. 10-2018-0157354.

* cited by examiner

FIG. 4
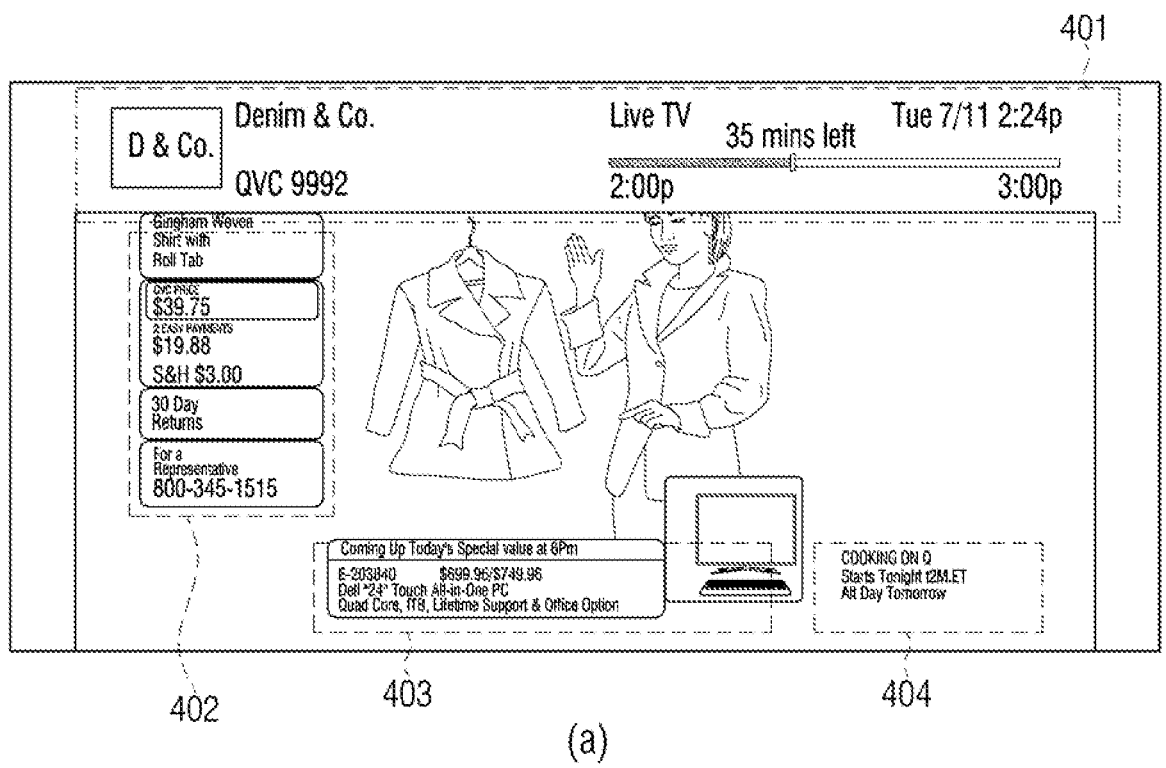
(a)
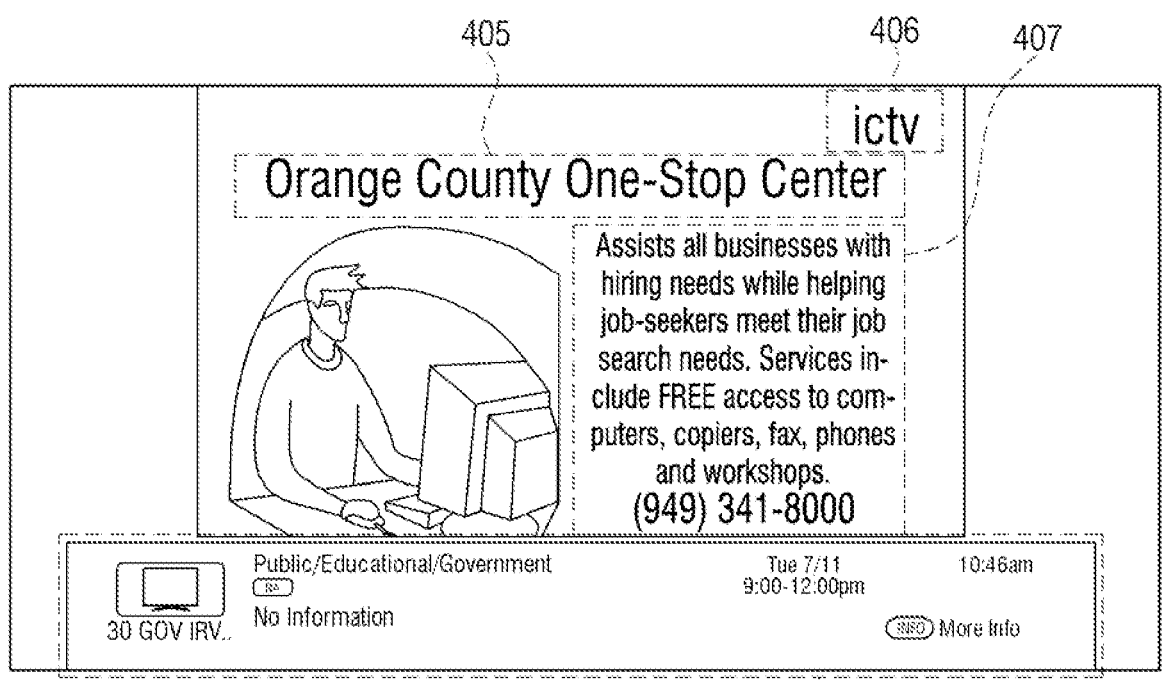
(b)

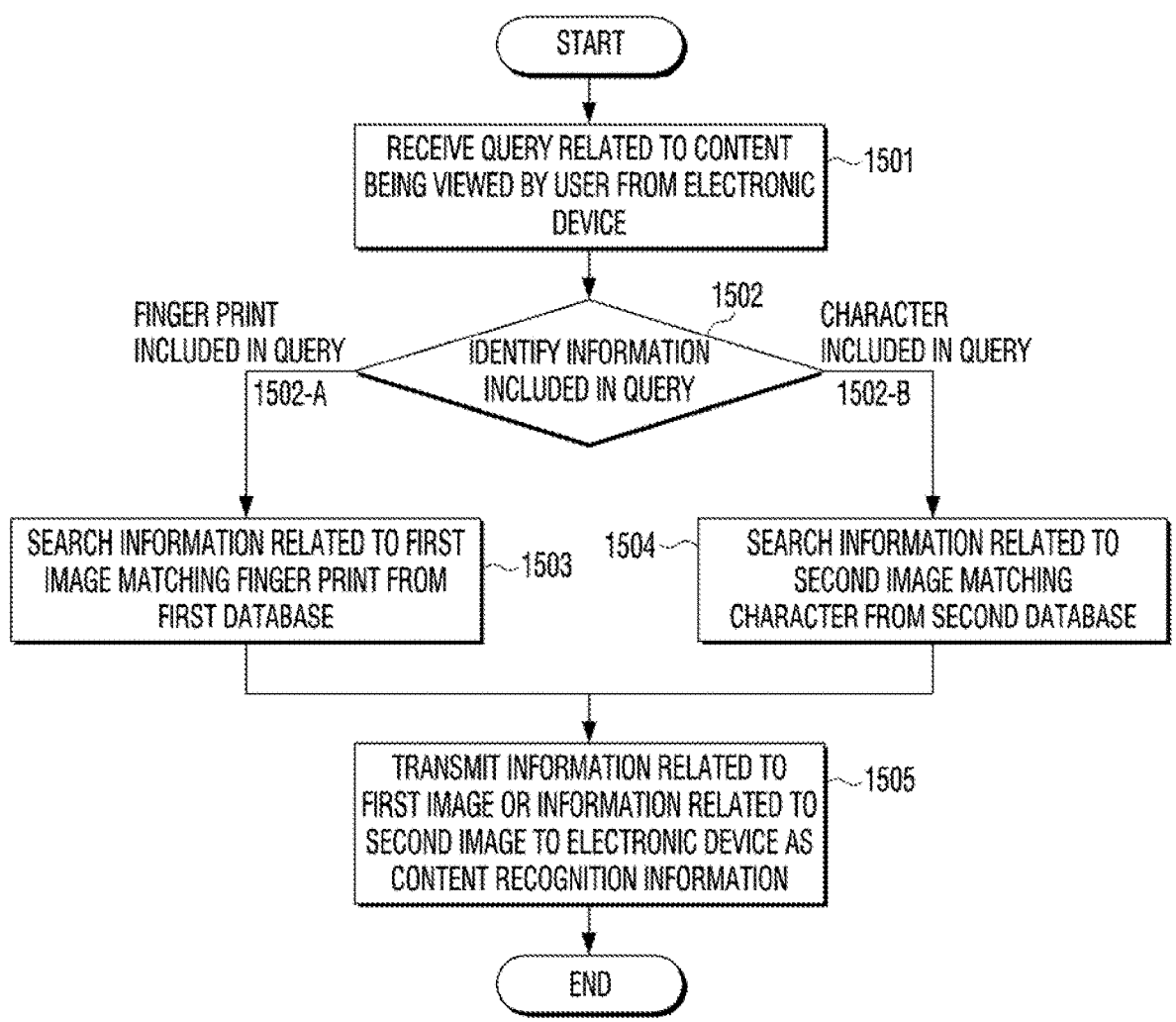

ELECTRONIC DEVICE AND CONTENT RECOGNITION INFORMATION ACQUISITION THEREFOR

TECHNICAL FIELD

The disclosure relates to an electronic device and a method of obtaining content recognition information thereof.

BACKGROUND ART

With needs of users becoming increasingly diversified, sources of a broadcast content or a multimedia content are changing from a public TV-orientated single source to various sources such as cable, Internet Protocol TV (IPTV), Video on Demand (VOD), and the like. Alternatively, sources providing information such as customized advertisements, program recommendations, or the like are also being generated.

Information such as customized advertisements or program recommendations as described above needs to be provided appropriately to fit a scene currently being output. For example, an advertisement message on a specific product is most effective when being displayed together with when a scene exposing the corresponding product is displayed. Accordingly, there is a need for technology which recognizes what content is currently being viewed by a viewer. Content recognition technology is necessary for not only customized advertisements, but also for ratings surveys, viewing pattern surveys, and the like.

To this end, a technology that recognizes content through a method of receiving a response from a server when an electronic device transmits a recognition request on a content that is currently being played back to a server has been introduced. For example, there may be technology such as an automatic contents recognition (ACR) which uses fingerprint.

DISCLOSURE

Technical Problem

When using a fingerprint extracted from an image of a content in order to recognize content that is being played back, it has been necessary to transmit the finger print to the server each time in order to recognize content.

In addition, in order to obtain a content recognition information matching the finger print extracted from the content that is currently being played back in the electronic device, a plurality of servers for storing information related to an image matching a pre-generated finger print may be required. For example, a plurality of servers may be required to process the finger print which may be received from numerous devices playing back content. Accordingly, cost for using or managing the plurality of servers may demanded. In addition, if finger print is extracted for each frame of the content and information related to the image is matched thereto beforehand, cost for supporting the above may also be necessary.

In addition, a greater amount of finger prints need to be extracted from the content to improve the image recognition range with respect to the content, but in this case, a multitude of servers may be required to store information related to the images matching the greater amount of finger prints.

The disclosure has been devised based on the above-described problems, and the disclosure provides an electronic device communicating with a server and a method of providing a content recognition information thereof.

Technical Solution

According to an embodiment, a method of obtaining a content recognition information of an electronic device includes capturing an image of a content; recognizing a character from a character area and obtaining the content recognition information matching the recognized character from a server based on identifying the character area in the captured image and extracting a finger print from the captured image and obtaining the content recognition information matching the extracted finger print based on the character area in the captured image not being identified; and storing at least one from among the content recognition information matching the obtained character and the content recognition information matching the finger print.

According to an embodiment, a method of obtaining a content recognition information of an electronic device includes capturing an image of a content; extracting a finger print from the captured image; transmitting the extracted finger print to a server; obtaining the content recognition information matching the finger print from the server based on succeeding in the finger print recognition and obtaining the content recognition information matching the character included in the captured image from the server based on failing in the finger print recognition; and storing at least one from among the content recognition information matching the finger print and the content recognition information matching the character.

According to an embodiment, an electronic device includes a communicator capable of communicating with a server; a memory configured to store instructions; and at least one processor configured to electrically coupled with the communicator and the memory, and the memory is configured to store instructions set to cause the at least one processor to, based on the electronic device being executed, capture an image of a content; based on a character area in the captured image being identified, recognize a character from the character area and obtain a content recognition information matching the recognized character from the server through the communicator; based on a character area in the captured image not being identified, extract a finger print from the captured image and obtain a content recognition information matching the extracted finger print from the server through the communicator; and store at least one from among the content recognition information matching the obtained character and the content recognition information matching the finger print.

According to an embodiment, an electronic device includes a communicator capable of communicating with a server; a memory configured to store instructions; and at least one processor electrically coupled with the communicator and the memory, and the memory is configured to store instructions set to cause the at least one processor to, based on the electronic device being executed, extract a finger print from the captured image; transmit the extracted finger print to the server through the communicator; based on succeeding in the finger print recognition, obtain a content recognition information matching the finger print from the server through the communicator; based on failing in the finger print recognition, obtain a content recognition information matching a character included in the captured image from the server through the communicator; and store at least one from among the content recognition information matching the finger print and the content recognition information matching the character.

According to an embodiment, a server includes a communicator capable of communicating with an electronic device; at least one memory configured to include a first data base including information related to a plurality of first images corresponding to each of a plurality of finger prints and a second database including information related to a plurality of second images corresponding to each of a plurality of characters; and at least one processor coupled with the at least one communicator and the at least one memory. The at least one processor is configured to control the communicator for a user to receive a query related to a content being viewed from the electronic device; based on a finger print being included in the received query, search for information related to a first image matching the finger print in the first database; based on a character being included in the received query, search for information related to a second image matching the character from the second database; and transmit information related to the searched first image or information related to the second image to the electronic device as content recognition information related to the content.

According to an embodiment, a server includes a communicator capable of communicating with an electronic device; at least one memory configured to include a first data base including information related to a plurality of first images corresponding to each of a plurality of finger prints and a second database including information related to a plurality of second images corresponding to each of a plurality of characters; and at least one processor coupled with the at least one communicator and the at least one memory. The at least one memory is configured to store instructions set to cause the at least one processor to, based on the server being executed, control the communicator to receive a query related to a content being viewed by a user from the electronic device; based on a finger print being included in the received query, search for information related to a first image matching the finger print from the first database; based on a character being included in the received query, search for information related to a second image matching the character from the second database; and control the communicator to transmit information related to the searched first image or information related to the second image to the electronic device as content recognition information related to the content.

According to an embodiment, a computer program product configured to store one or more computer programs including instructions that, when performed by a processor of a computer, is set to, control to capture an image of a content; based on a character area being identified in the captured image, recognize a character from the character area and control for content recognition information matching the recognized character to be obtained from a server; based on a character area not being identified in the captured image, extract a finger print from the captured image and control to obtain content recognition information matching the extracted finger print from the server; and control to store at least one from among the content recognition information matching the obtained character and the content recognition information matching the finger print.

Effect of Invention

According to an embodiment of the disclosure, consumption of resource based on additionally obtaining or maintaining finger print may be reduced. In particular, maintenance cost of a server storing or managing information related to an image matching a large amount of finger prints may be reduced when targeting a large amount of content.

In addition, according to an embodiment of the disclosure, because content recognition information may not only be obtained by using a finger print, but also obtained by using a character included in a captured image, an image recognition range (or, image recognition probability) may be greatly enhanced.

In addition thereto, an effect which may be obtained in the disclosure is not limited to the effects disclosed, and other undescribed effects may be clearly understood by those of ordinary skill in the related art from the description below.

DESCRIPTION OF DRAWINGS

FIG. 4 include example diagrams illustrating a character area according to an embodiment of the disclosure;

FIG. 15 is a flowchart of a server according to an embodiment of the disclosure.

DETAILED DESCRIPTION OF EXEMPLARY EMBODIMENTS

Figure 1:
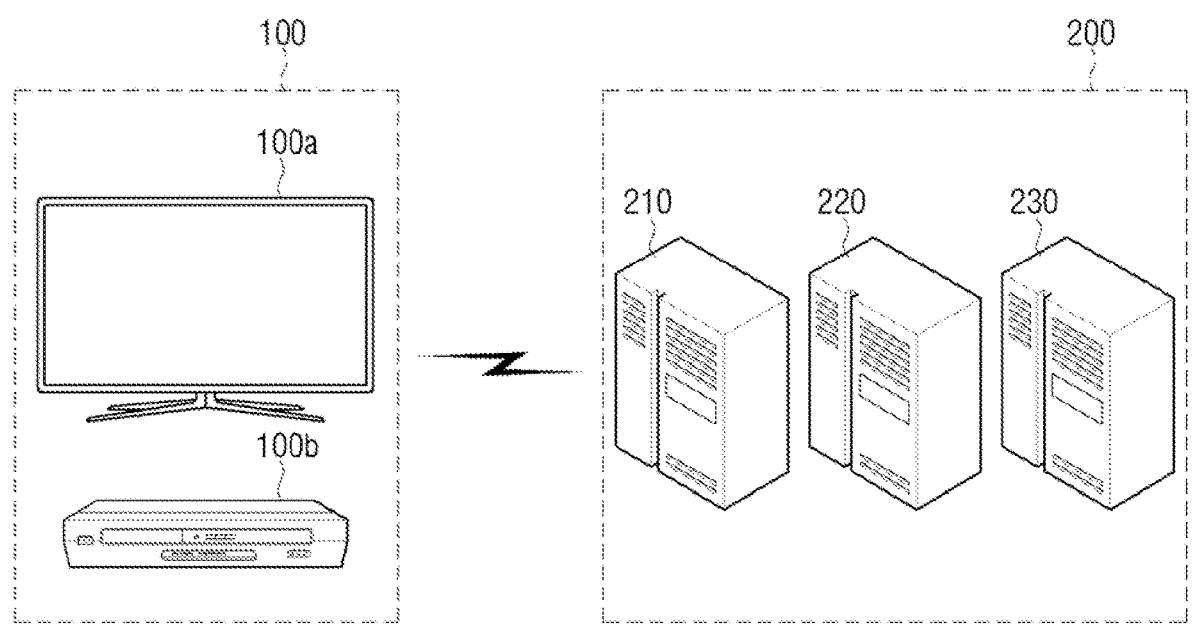
FIG. 1 is a diagram illustrating a content recognition system according to an embodiment of the disclosure.

Herein, various embodiments of the present disclosure are described with reference to the accompanying drawings. However, it should be noted that the various embodiments are not for limiting the scope of the disclosure to a specific embodiment, but should be interpreted to include all modifications, combinations, equivalents and/or alternatives of the embodiments. In describing the embodiments, like reference numerals may be used to refer to like elements.

In the disclosure, expressions such as "comprise," "may comprise," "consist of," "may consist of," or the like are used to designate a presence of a corresponding characteristic (e.g., elements such as numerical value, function, operation, or component, etc.), and not to preclude a presence or a possibility of additional characteristics.

In the present disclosure, expressions such as "A or B," "at least one of A and/or B," or "one or more of A and/or B" should be understood to include all possible combinations of the items listed together. For example, "A or B," "at least one of A and B," or "at least one of A or B" should be understood to represent all cases including (1) at least one of A, (2) at least one of B, or (3) at least one of A and at least one of B.

Expressions such as "first," "second," "1st," or "2nd" as used herein may denote various elements, regardless of order and/or importance, may be used to distinguish one element from another, and does not limit the corresponding elements. For example, a first user device and a second user device may represent different user devices regardless of order and importance. For example, without exceeding the claimed scoped described herein, a first element may be designated as a second element, and similarly a second element may also be designated as a first element.

Terms such as "module," "unit," "part," and the like used herein may be terms for referring to an element that performs at least one function or operation, and such element may be implemented as hardware or software, or a combination of hardware and software. Further, except for when each of a plurality of "modules," "units," "parts," and the like need to be implemented in an individual hardware, the components may be integrated in at least one module or chip and implemented in at least one processor.

When a certain element (e.g., first element) is indicated as being "(operatively or communicatively) coupled with/to" or "connected to" another element (e.g., second element), it could be understood as the certain element being directly coupled with/to the other element or as being coupled through still another element (e.g., third element). On the other hand, when a certain element (e.g., first element) is indicated as "directly coupled with/to" or "directly connected to" another element (e.g., second element), it could be understood as still another element (e.g., third element) not being present between the certain element and the other element.

The terms used in the disclosure are used merely to describe a certain embodiment, and not intended to limit the scope of other embodiments. A singular expression includes a plural expression, unless otherwise specified. The terms used herein, including technical or scientific terms, may have the same meaning as the terms generally understood by those of ordinary skill in the art in the technical field disclosed in the disclosure. The terms defined in a general dictionary from among the terms used herein may be interpreted to a meaning identical or similar to a meaning based on context in the related art. Unless otherwise clearly specified, the terms may not be interpreted to ideal or excessively formal meanings. In some cases, even when a term is defined in the disclosure, the terms may not be interpreted to exclude the embodiments of the disclosure.

In the disclosure, "content" may include a picture, image, audio or a combination thereof. In addition, "content" may include a broadcast content (or, broadcast program), a live broadcast content, a recorded broadcast content, advertisement content, a digital video recorder (DVR) content, a video on demand (VoD) content, VoD/OTT Non-linear content, UGC content, or a combination thereof.

FIG. 1 is a diagram illustrating a content recognition system according to an embodiment of the disclosure.

Referring to FIG. 1, the content recognition system may include an electronic device 100 and a server (or, cloud) 200 comprised of one or more servers.

Referring to FIG. 1 the electronic device 100 may be a device which receive a content signal and capable of either providing an image and/or an audio based on the content signal on its own, or through another electronic device coupled with the electronic device 100. For example, examples of the electronic device may include, for example, and without limitation, a television (TV), a set-top box, a TV box (e.g., a SAMSUNG HOMESYNC™, a SAMSUNG ONE CONNECT BOX™, an APPLE TV™ or a GOOGLE TV™), or the like.

According to an embodiment, the electronic device 100 may be a display device 100a. The display device 100a may be a television, but this is merely one embodiment, and may include at least one of, for example, a smartphone, a tablet personal computer (PC), a e-book reader, a desktop PC, a laptop PC, a netbook computer, a personal digital assistant (PDA), a portable multimedia player (PMP), a medical device, a vehicle head unit, a POS of a shop, an Internet of Things (IOT) device, a camcorder, an electronic frame, or a wearable device which includes a display part. According to various embodiments, the wearable device may include at least one of an accessory type (e.g., a watch, a ring, a bracelet, an anklet, a necklace, a pair of glasses, a contact lens or a head-mounted-device (HMD)), a fabric or a garment-embedded type (e.g., an electronic clothing), a body-attached type (e.g., a skin pad or a tattoo), or a bio-implantable circuit (e.g., implantable circuit).

In another example, the electronic device 100 may be a content providing device 100b providing content to the display device 100a. The content providing device 100b may be a broadcast content receiving device such as a set-top box, but this is merely one embodiment, and may include at least one of, for example, a smartphone, a tablet PC, a e-book reader, a desktop PC, a laptop PC, a netbook computer, a PMP, a medical device, a vehicle head unit, a POS of a shop, an IoT device, a camcorder, an electronic frame, a wearable device or a server capable of providing content.

In the disclosure, the electronic device 100 may capture an image of a content which is being played back, and extract a finger print of an image by using the image of a captured content. The finger print may, as a characteristic data representing a characteristic of an image, for example, be designated as finger print data, DNA data or gene data. The finger print extracted from the image may include, for example, and without limitation a motion vector of an image, color information, a picture vector, or the like. The characteristic data may be different from normal metadata in that the characteristics of the signal itself of the content may be reflected.

The server 200 may include a database including image related information (or, information related to an image). The server 200 may be comprised on one or more servers. For example, the server 200 may include at least one from among a finger print matching server 210, a capture server 220, an image related information server 230 (e.g., EPG server, metadata dedicated server).

The finger print matching server 210 may first prepare information related to a finger print and an image matching the finger print. To this end, the capture server 220 may extract a finger print from each image (or, frame) of a content scheduled for broadcast provided from a content source. The capture server 220 may transmit a name of a broadcast channel and/or a broadcast time related to the extracted finger print to the image related information server 230. For example, the capture server 220 may transmit the name of broadcast channel and the broadcast time related to the extracted finger print to the image related information server 230. The capture server 220 may, as a response to the transmission, obtain image related information based on the name of broadcast channel and the broadcast time from the image related information server 230. The image related information may include information related to a broadcast program such as, for example, and without limitation, a name of a broadcast program, a genre of a broadcast program, and the like. The capture server 220 may perform matching of the previously extracted finger print and the obtained image related information. The capture server 220 may provide the finger print and the image related information matching the finger print to the finger print matching server 210.

The finger print matching server 210 may receive the finger print extracted from the image captured from the content from the electronic device 100. In addition, the finger print matching server 210 may receive a personalized server ID (PSID) identifying the electronic device 100 or a user of the electronic device 100 and a time information together with the finger print. The finger print matching server 210 may obtain image information matching the finger print by recognizing the received finger print. The finger print matching server 210 may, as a response corresponding to receiving the captured image from the content, transmit the obtained image related information to the electronic device 100 as content recognition information. That is, based on the electronic device 100 being a digital TV, the content recognition information may, as a result having recognized the content being viewed by the user, be image related information obtained from the server by the digital TV.

The image related information server 230 may store the content itself or the image related information related to each image of the content. The image related information may include at least one of, for example, metadata, an identifier of metadata, and an address information to which metadata is located. The metadata may include at least one of, for example, a content identifier (or, program identifier), a name of content (or, name of program), and an electronic program guide (EPG) metadata. In addition, the metadata may include at least one from among cast information of a content or an image, information on a product of a content or an image, channel information playing back a content, and broadcast company information playing a content.

The system of FIG. 1 may further include an analysis server (not shown). The analysis server may obtain a viewing log information of the user from the electronic device 100, and analyze therefrom. The viewing log information of the user may include content recognition information and the like obtained by using the PSID and the captured image. The analysis server may, based on the user viewing log information, determine additional service information related to the image viewed by the user. The analysis server may control the analysis server itself or another operably coupled server so that the determined additional service information may be provided to the electronic device 100. The additional server information may be, for example, real-time news articles related to a cast member in an image, information recommending movies which the cast member has appeared in a leading role, advertisement information on a product included in the image, or the like. In addition, additional service information may include at least one from among, for example, an additional service image, an address of a server providing an additional service, a route for obtaining additional service, an address for additional service, a starting time of an additional service, an end time of an additional service, a lifetime of an additional service, and a description of an additional service.

In the system of FIG. 1, at least one from among the electronic device 100, the server 200, and the analysis server (not shown) may be communicatively coupled therebetween through a short-range network or a long-range network. The being communicatively coupled may include being directly coupled using a short-range communication technology or being communicatively coupled through a third relay. The third relay may include at least one from among, for example, a base station, a hub, an access point, a gateway, a switch, a relay server, a transmission server, and a front-end server.

Figure 2:
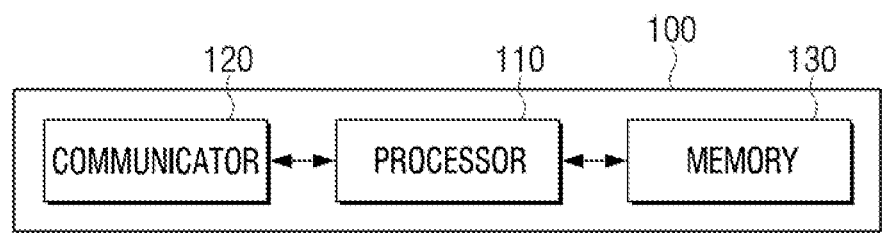
FIG. 2 is a block diagram illustrating an electronic device according to an embodiment of the disclosure.

FIG. 2 is a block diagram illustrating an electronic device 100 according to an embodiment of the disclosure.

Referring to FIG. 2, the electronic device 100 may include a communicator 120, a memory 130, and a processor 110. Even if the diagram not illustrated according to the embodiment, hardware/software configurations appropriate to a level which would be obvious to those of ordinary skill in the art may be additionally included in the electronic device 100.

The communicator 120 of the electronic device 100 may communicate with an external device (e.g., server 200) coupled to a network through wireless communication or wired communication. For example, the communicator 120 may perform communication with the external device through a communication method such as, for example, and without limitation, infrared data association (IrDA), radio frequency identification (RFID), near field communication (NFC), wireless fidelity (Wi-Fi), ultra wideband (UWB), wireless display (WiDi), wireless HD (WiHD), wireless home digital interface (WHDI), Miracast, wireless gigabit alliance (Wigig), Wi-Fi direct, Bluetooth (e.g., Bluetooth classic, Bluetooth low energy), an AirPlay, Z-wave, 4LoW-PAN, LTE D2D, GPRS, Weightless, Edge, ZigBee, digital living network alliance (DLNA), ANT+, digital enhanced cordless telecommunications (DECT), wireless local area network (WLAN), global system for mobile communications (GSM), universal mobile telecommunication system (UMTS), long-term evolution (LTE), wireless broadband (WiBRO), or the like.

The memory 130 of the electronic device 100 may be configured to, for example, include an embedded memory or an external memory. The embedded memory may, for example, and without limitation, include at least one from among a volatile memory (e.g., dynamic RAM (DRAM), static RAM (SRAM) or synchronous dynamic RAM (SDRAM), etc.), or a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash, etc.), hard drive, solid state drive (SSD)), or the like.

The external memory may include a flash drive such as, for example, and without limitation, a compact flash (CF), a secure digital (SD), a micro secure digital (Micro-SD), mini secure digital (Mini-SD), an extreme digital (xD), a multi-media card (MMC), a memory stick, or the like. The external memory may be functionally and/or physically coupled with the electronic device 100 through various interfaces.

The memory 130 may be accessed by the processor 110, and reading/recording/modifying/deleting/updating and the like of data may be performed by the processor 110.

In the disclosure, the term memory may include at least one from among a memory provided separately from the processor 110, a read only memory (ROM) and a random access memory (RAM) in the processor 110.

The processor 110 may be a configuration for controlling the overall operation of the electronic device 100. For example, the processor 110 may drive the OS or an application program to control the plurality of hardware or software elements coupled to the processor 110, and perform various data processing and calculations. The processor 110 may be a central processing unit (CPU) or a graphics-processing unit (GPU), or both. The processor 110 may be implemented as at least one of a general processor, a digital signal processor, an application specific integrated circuit (ASIC), a system on chip (SoC), a microcomputer (MI-COM), or the like. The processor 110 may, by executing computer executable instructions stored in the memory 130, perform the operations of the electronic device 100 according to the various embodiments.

According to an embodiment, the memory 130 may be configured to, based on being executed by the electronic device 100, store instructions set to cause the processor 110 to, capture an image of a content, based on an identification result of a character area included in the captured image, recognize a character from a character area and obtain content recognition information matching the recognized character from the server 200 through the communicator 120 or extract a finger print from the captured image and obtain content recognition information matching the extracted finger print from the server 200 through the communicator 120, and store at least one of the content recognition information matching the obtained character and the content recognition information matching the finger print.

According to an embodiment, the memory 130 may be configured to store instructions set to cause the processor 110 to, based on a character area being identified in the captured image, recognize a character from the character area and obtain content recognition information matching the recognized character from the server 20 through the communicator 120.

According to an embodiment, the memory 130 may be configured to store instructions set to cause the processor 110 to, based on a character area not being identified in the captured image, extract a finger print from the captured image and obtain content recognition information matching the extracted finger print from the server 200 through the communicator 120.

According to an embodiment, the memory 130 may be configured to store instructions set to cause the processor 110 to, based on a result confirming whether the captured image is a recognition target for a finger print, obtain content recognition information matching the recognized character from the server 200 through the communicator 120.

According to an embodiment, the memory 130 may be configured to store instructions set to cause the processor 110 to, transmit the recognized character to the server 200 through the communicator 120, and based on the captured image being not identified as the recognition target for the finger print based on the transmitted character, obtain content recognition information matching the recognized character from the server 200 through the communicator 120.

According to an embodiment, the memory 130 may be configured to store instructions set to cause the processor 110 to, transmit the stored content recognition information to an external analysis server which analyzes a viewing log of the user.

According to an embodiment, the server 200 providing content recognition information matching the character may be a character matching server (e.g., the image related information server 230 of FIG. 1) included in the server 200. In addition the server 200 providing content recognition information matching the finger print may be a finger print matching server (e.g., the finger print matching server 210 of FIG. 1) included in the server 200.

According to an embodiment, the content recognition information may include metadata related to a captured image, an address storing the metadata or an identifier of the metadata.

According to an embodiment, the memory 130 may be configured to store instructions set to cause the processor 110 to, based on being executed by the electronic device 100, capture an image of a content, extract a finger print from the captured image, transmit the extracted finger print to the server 200 through the communicator 120, based on the recognition result of the finger print, obtain content recognition information matching the finger print from the server 200 through the communicator 120 or obtain content recognition information matching the character included in the captured image from the server 200 through the communicator 120, and store at least one from among the content recognition information matching the finger print and the content recognition information matching the character.

According to an embodiment, the memory 130 may be configured to store instructions set to cause the processor 110 to, based on a character area being identified in the captured image, transmit a character recognized from the character area to the character matching server, and based on a character not being identified in the captured image, transmit the extracted finger print to the finger print matching server.

According to an embodiment, the memory 130 may be configured to store instructions set to cause the processor 110 to, identify a type of content, extract a finger print from a captured image regardless of whether a character area is identified based on the type of the identified content and obtain content recognition information matching the extracted finger print from the server 200 through the communicator 120.

Figure 3:
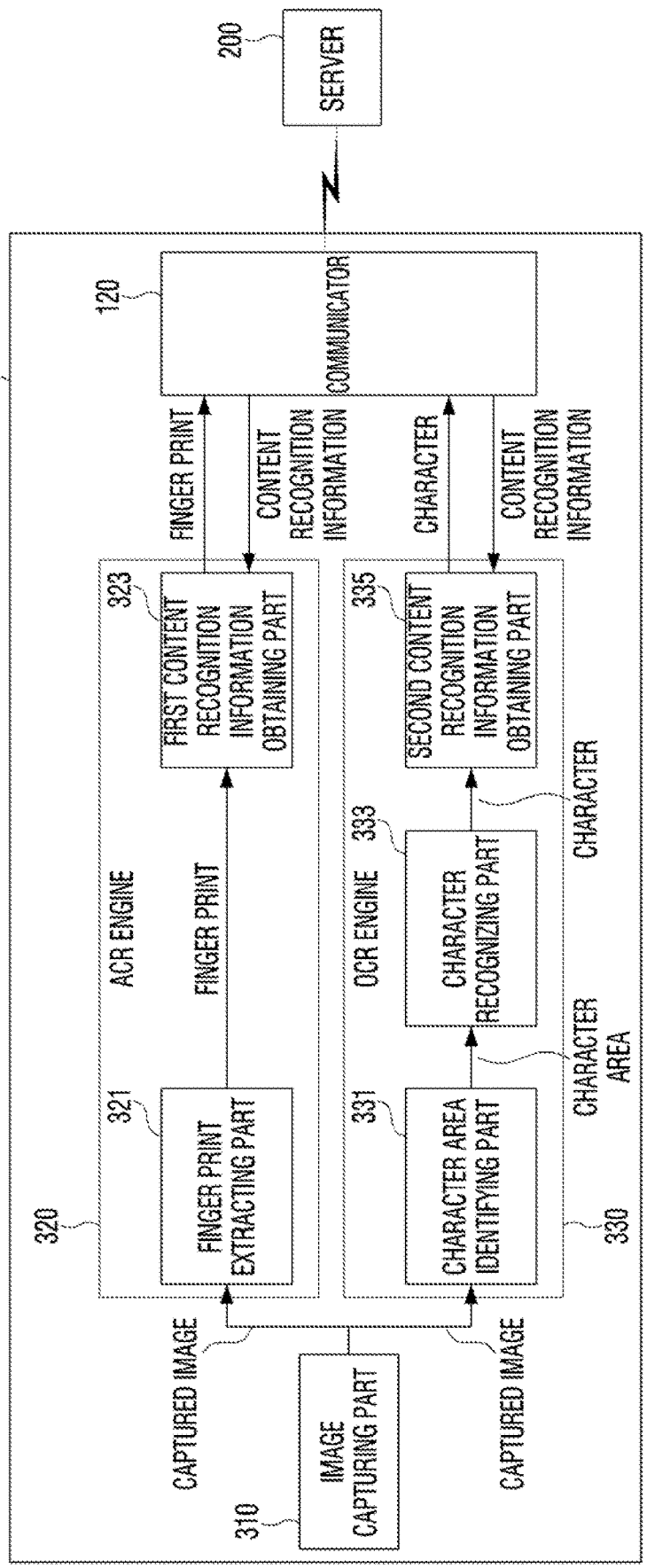
FIG. 3 is a detailed block diagram of an electronic device according to an embodiment of the disclosure.

FIG. 3 is a detailed block diagram of an electronic device 100 according to an embodiment of the disclosure.

Referring to FIG. 3, the processor 110 of the electronic device 100 may include an image capturing part 310, an ACR engine 320, and an OCR engine 330.

The image capturing part 310 may capture an image of a content. For example, the image capturing part 310 may capture an image being played back in a display part device 100*a*. Alternatively, the image capturing part 310 may capture one or more frames from the image being played back. For example, if the received image is based on an interlace scanning method, the image capturing part 310 may capture at least one of a field picture of an odd number line and a field picture of an even number line in the image. The image capturing part 310 may capture an image being displayed on a screen or capture a video signal comprising a content. In an embodiment, the image capturing part 310 may capture an image for each predetermined period (e.g., a value between 0.3 seconds to 1 second).

The image capturing part 310 may transfer the captured image to an ACR engine 320. According to various embodiments, the ACR engine 320 may be configured to include the image capturing part 310.

The ACR engine 320 may include a finger print extracting part 321 and a first content recognition information obtaining part 323.

The finger print extracting part 321 may extract a finger print from the captured image. According to various embodiments, the finger print extracting part 321 may, except for a predetermined area in the image, extract a finger print. The predetermined area may be an area in which, for example, a subtitle, a logo, advertisement information, broadcast channel information, or the like may be located. According to various embodiments, the finger print extracting part 321 may transmit the captured image to an external server (not shown), and obtain a finger print of the captured image as a result of recognizing the captured image from the external server (not shown).

The first content recognition information obtaining part 232 may obtain content recognition information matching the extracted finger print. For example, the first content recognition information obtaining part 323 may transmit the finger print to the server 200 through the communicator 120. The server 200 may include, for example, the finger print matching server 210 of FIG. 1. The server 200 which received the finger print may perform finger print recognition. Here, the performing recognition of the received finger print by the server 200 may refer to, the server 200 searching for a pre-stored finger print similar or identical with the received finger print, and attempting to obtain image related information matching the searched finger print.

In an implementation, the server 200 may search for similarities between the received finger print and the finger prints that are pre-stored in the server 200, and based on the similarity of the two finger prints being a threshold value or less (or, exceeding a threshold value), determine the two finger prints as identical, and based on the similarity of the two finger prints exceeding a threshold value (or, a threshold value of less), determine the two finger prints as different from each other. For example, the server 200 may compare the two images by using a matching technique using a hamming distance.

Based on checking the similarity between the finger print obtained by the server 200 and a pre-stored finger print, if the two finger prints are determined as identical or similar to each other, the server 200 may determine the image related information matching the pre-stored finger print which is identical or similar with the received finger print as content recognition information matching the received finger print. The image related information may be obtained from, for example, a database of the finger print matching server 210 or a database of the image related information server 230 in FIG. 1. The server 200 may search the database by using, for example, a binary search technique (e.g., B-tree or Hashing). The technique of comparing two finger prints or searching databases is not limited to the above-described technique, and may be substituted with a different algorithm within a scope which may be realized by those of ordinary skill in the related art.

Based on the server 100 performing recognition of the received finger print, if the finger print recognition is a success, the server 200 may transmit the content recognition information matching the received finger print to the electronic device 100. If the electronic device 100 receives the content recognition information through the communicator 120, the first content recognition information obtaining part 323 may store the content recognition information matching the received finger print in the memory 130 as a viewing log information of the user.

On the other hand, if the server 200 fails in the finger print recognition, the server 200 may transmit a fail message (or, an unknown message) notifying failure in finger print recognition to the electronic device 100. The server failing in the recognition of finger print may include, for example, the server 200 failing in the search of the pre-stored finger print that is identical with or similar to the received finger print. Alternatively, even when the server 200 successful in the search of the pre-stored finger print that is identical with or similar to the received finger print, the server failing in the recognition of finger print may include failing in the search of image related information matching the searched finger print.

The optical character recognition (OCR) engine 330 may include a character area identifying part 331 (or, character area detector), a character recognizing part 333, and a second content recognition information obtaining part 335.

The character area identifying part 331 may identify the character area included in the captured image. The character area may include, for example, an OSD area, a UI area of a predetermined form, or the like. In an implementation, the character area may include, for example, a subtitle area, a logo area, an advertisement information area, a broadcast channel information area, an area to which a character is included in the content, or the like. FIG. 4 includes diagrams illustrating an example of a character area according to an embodiment of the disclosure. FIGS. 4A and 4B represent captured images according to an embodiment of the disclosure. In the captured images, 401 and 408 represent the broadcast channel information area (e.g., EPG area), 402, 403 and 404 represent the advertisement information area, 406 represents the logo area, and 405 and 407 represent the area to which the character is included in the content.

The character area identifying part 331 may perform detection by using, for example, an artificial intelligence algorithm (e.g., neural network algorithm, deep learning algorithm, etc.) or a specific UI template to identify the character area. The specific UI template may, for example, be a template to which a character is inserted that is provided by an OSD, a banner, a content source company or an advertisement company.

The character recognizing part 333 may recognize the character included in the character area. The recognized character may be, for example, a channel number, a content title (or, name of broadcast program), a content description, a content source address, a content start/playback/end time, a cable broadcast company, a set-top box provider, an advertisement content, or the like. The character recognizing part 333 may recognize one or more languages. Alternatively, the character recognizing part 333 may also recognize a sentence with multiple languages mixed therein. According to various embodiments, the character recognizing part 333 may transmit the character area to an external character recognition server (not shown), and also obtain a character included in the character area from the character recognition server (not shown).

The second content recognition information obtaining part 335 may obtain content recognition information matching the recognized character. For example, the second content recognition information obtaining part 335 may transmit the recognized character to the server 200 through the communicator 120. The server may, for example, include the image related information server 230 of FIG. 1 as a character matching server. The server 200 which received the character may search for information related to the image matching the character. For example, the server 200 may search for information related to the image which includes at least some of the recognized character. Alternatively, the server 200 may search for information related to the image with a similarity or a high relevance to the recognized character. Specifically, if the recognized character includes a content title, the server 200 may search for image related information that includes the content title or has high relevance with the content title. The server 200 may transmit the searched image related information to the electronic device 100 as content recognition information. Based on the electronic device 100 receiving content recognition information through the communicator 120, the second content recognition information obtaining part 335 may store the content recognition information matching the received character in the memory 130 as viewing log information of the user. According to various embodiments, the content recognition information may also be a metadata identifier or a metadata storing address. In this case, the second content recognition information obtaining part 335 may first receive the metadata identifier or the metadata storing address, and may obtain the actual metadata thereafter by using the pre-obtained metadata identifier or the metadata storing address.

On the other hand, based on the server 200 failing in the search for content recognition information, the server 200 may transmit a fail message (or, an unknown message) notifying failure in content recognition information to the electronic device 100.

According to various embodiments, the process of obtaining content recognition information matching the character may be performed in the electronic device 100. For example, the memory 130 of the electronic device 100 may be included with image related information (e.g., EPG information, etc.) corresponding to each of the characters. The image related information may be received from the server 200 and stored in the memory 130 based on an a predetermined time, periodically or an event occurring. For example, based on a content starting, a channel being changed, or receiving a user request command, the electronic device 100 may receive image related information from the server 200 and store in the memory 130. In this case, the second content recognition information obtaining part 335 may search the memory of the electronic device 100 for the image related information matching the character recognized in the character recognizing part 333. When the image related information is searched, the second content recognition information obtaining part 335 may use the searched image related information as content recognition information matching the recognized character.

According to various embodiments, based on the ACR engine 320 failing to extract the finger print from the captured image or failing to recognize the finger print, the OCR engine 330 may obtain the content recognition information matching the character included in the captured image. For example, based on the electronic device 100 receiving a fail message notifying failure of finger print recognition from the server 200, the OCR engine 330 may obtain content recognition information matching the character included in the captured image.

According to various embodiments, the OCR engine 330 may omit the character area identification process and immediately obtain the character included in the captured image. Further, the OCR engine 330 may obtain the content recognition information matching the obtained character.

According to various embodiments, while the ACR engine 320 recognizes the finger print by using the server 200, the OCR engine 330 may perform at least one from among the process of identifying the character area included in the captured image, the process of recognizing the character area included in the captured image, and the process of obtaining content recognition information matching the character together therewith.

According to various embodiments, the OCR engine 330 may first identify the character area. In this case, if the OCR engine 330 fails in the identification of the character area, the ACR engine 320 may obtain the content recognition information matching the finger print from the server 200. If the OCR engine 330 is successful in the identification of the character area, the OCR engine 330 may obtain the content recognition information matching the recognized character from the server 200 by recognizing the character from the character area. In this case, the process of the ACR engine 320 obtaining content recognition information matching the finger print from the server 200 may be omitted.

Based on the content recognition information obtained from the ACR engine 320 and the OCR engine 330 being stored in the memory 130 as a viewing log information of the user, the image capturing part 310 may capture the next image of the content. The storing of the viewing log information in the memory 130 may include temporarily storing for transmitting to the external device. The processor 110 of the electronic device 100 may be configured to control the communicator 120 to cause the temporarily stored viewing log information to be transmitted to an analysis server (not shown).

Figure 5:
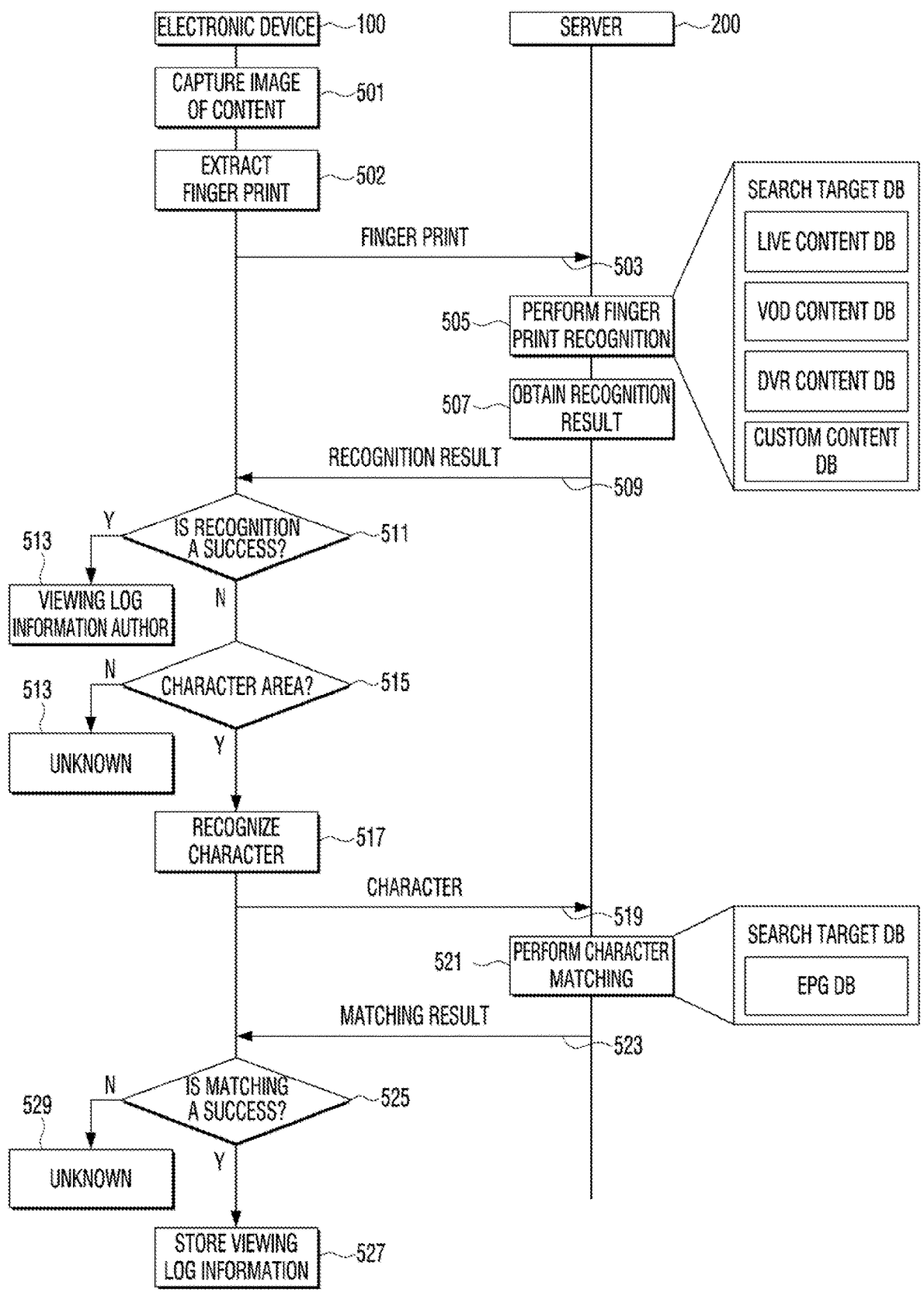
FIGS. 5 to 7 are flowcharts illustrating a process of obtaining content recognition information from a server by an electronic device according to an embodiment of the disclosure.
Figure 6:
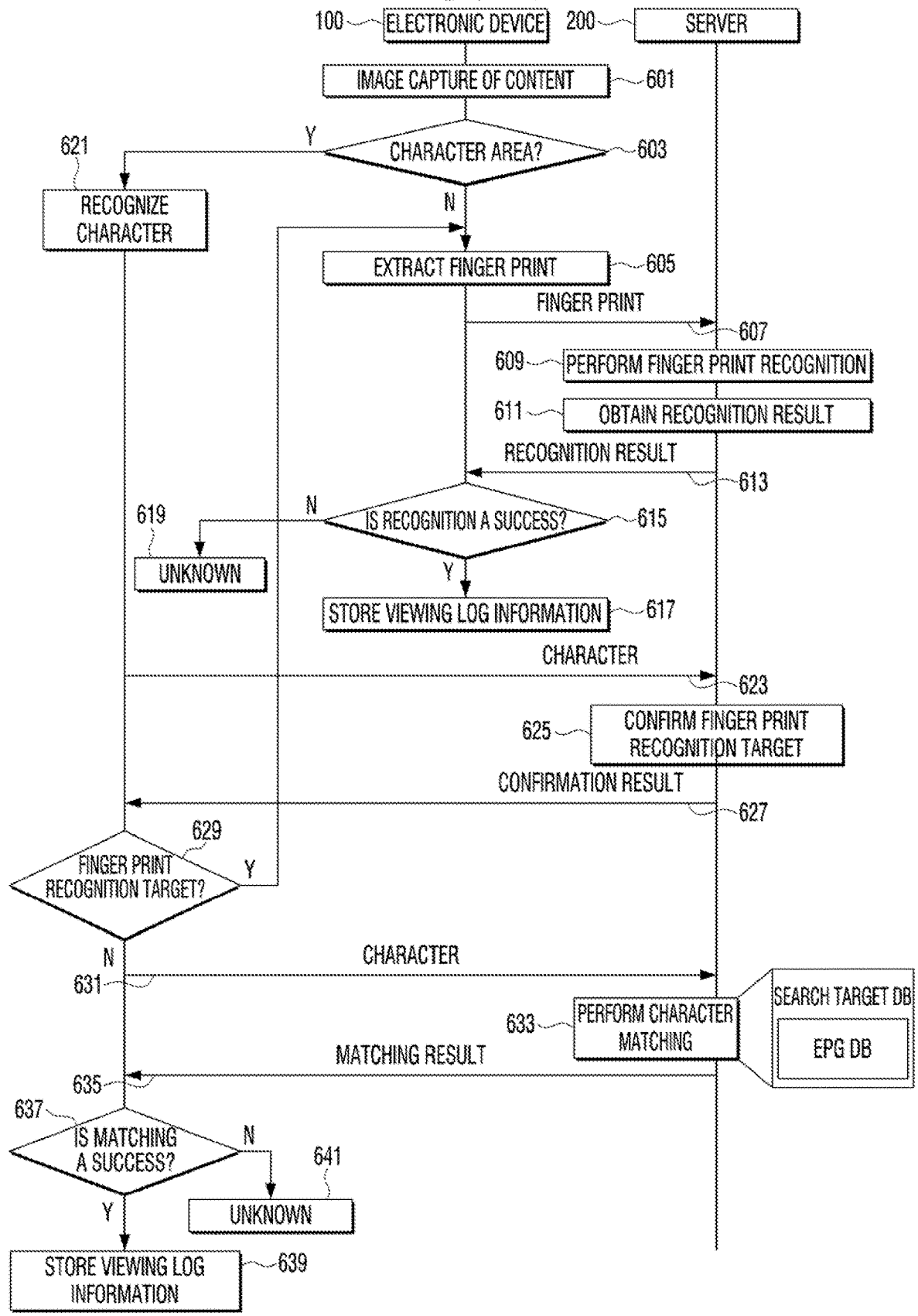
Figure 7:
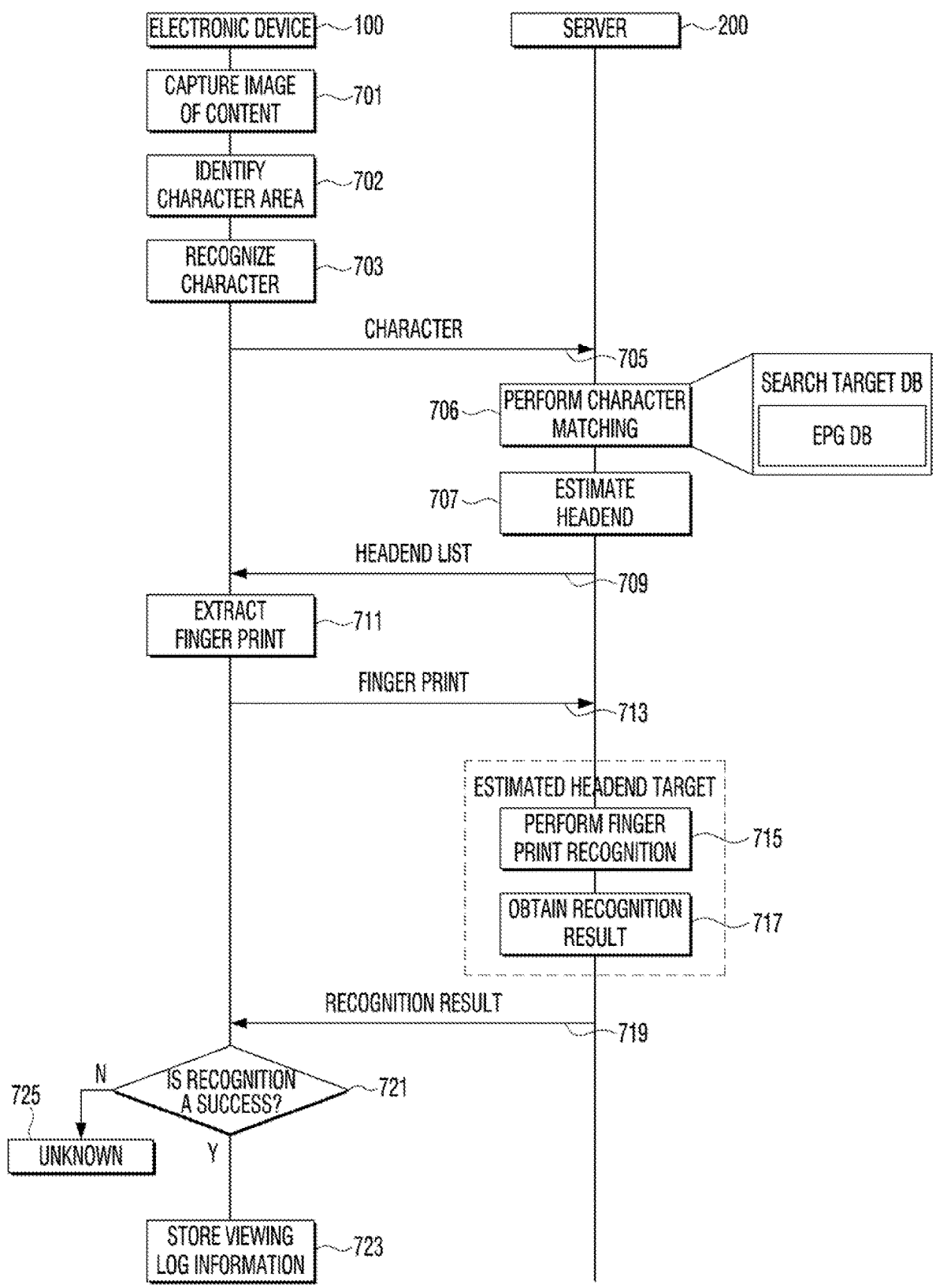

FIGS. 5 to 7 are flowcharts illustrating a process of obtaining content recognition information according to another embodiment of the disclosure.

Referring to FIGS. 5 to 7, each system may include the electronic device 100 and the server 200.

First, referring to FIG. 5, the processor 110 of the electronic device 100 may be configured to capture an image of a content (501).

The processor 110 of the electronic device 100 may be configured to extract a finger print from the captured image (502).

The processor 110 of the electronic device 100 may be configured to control the communicator 120 to cause the extracted finger print to be transmitted to the server 200 (503).

The server 200 may perform recognition of the received finger print (505). In an implementation, the server 200 may search for the pre-stored finger print that is identical with or similar to the received finger print, and obtain image related information matching the searched finger print. The server 200 may search for image related information matching the received finger print in various databases. For example, the server may search for image related information matching the finger print in the order of a live content database (DB), a VOD content database (DB), a digital video recorder (DVR) content (e.g., recorded content) database (DB), and a custom content (e.g., advertisement content) database (DB), but the embodiment is not limited to the above-described databases or the order thereof.

The server 200 may obtain a recognition result by performing recognition of the received finger print (507). The server 200 may transmit the recognition result of the obtained finger print to the electronic device 100 (509). For example, based on the server 200 succeeding in finger print recognition, the server 200 may transmit the content recognition information matching the finger print to the electronic device 100 as the recognition result. On the other hand, based on the server 200 failing in finger print recognition, the server 200 may transmit a fail message notifying failure of finger print recognition to the electronic device 100.

The processor 110 of the electronic device 100 may, based on the received recognition result, determine whether recognition of the captured image has failed or succeeded (511). In this case, the recognition success likelihood of the captured image may be, for example, between approximately 50% to 70%, and the recognition failure likelihood of the captured image may be, for example, between approximately 30% to 50%. The recognition success likelihood or the recognition failure likelihood may refer to, for example, the likelihood of recognition of the captured image being successful or failing within a specific period (e.g., a week, a month, etc.) or a specific number of people.

If the recognition of the finger print is a success (511—Y), the processor 110 of the electronic device 100 may be configured to control the memory 130 to cause the content recognition information matching the obtained finger print to be stored as the viewing log information of the user (513).

On the other hand, if the recognition of the finger print is a fail (511—N), the processor 110 of the electronic device 100 may be configured to determine whether the character area (e.g., OSD area, a UI area of a pre-defined form, etc.) is included in the captured image (515).

Based on the determination result (or, identification result) of the character area, the processor 110 of the electronic device 100 may perform recognition of the captured image.

Based on succeeding in the identification of the character area (515—Y), the processor 110 of the electronic device 100 may be configured to recognize the character included in the identified character area (517).

On the other hand, based on failing in the identification of the character area (515—N), the processor 110 of the electronic device 100 may be configured to record as the captured image being in an unrecognizable state (or, unknown state) (513).

Based on succeeding in the identification of the character area (515—Y), the processor 110 of the electronic device 100 may be configured to control the communicator 120 to cause the recognized character to be transmitted to the server 200 (519).

The server 200 may perform a search of the image related information matching the character (521). For example, the server 200 may search the EPG database for image information matching the character. The server 200 may transmit the matching result of the character to the electronic device 100 (523). For example, based on the server 200 succeeding in the search of image information, the server 200 may transmit the content recognition information to the electronic device 100 as the matching result. On the other hand, based on the server 200 failing on the search of image information, the server 200 may transmit a fail message notifying failure of the search to the electronic device 100 as the matching result.

The processor 110 of the electronic device 100 may, based on the received matching result, determine whether obtaining content recognition information matching the character was a failure of a success (525).

Based on succeeding in obtaining the content recognition information (525—Y), the processor 110 of the electronic device 100 may be configured to control the memory 130 to cause the content recognition information matching the obtained character to be stored as the viewing log information of the user (527). In this case, the recognition likelihood of the captured image may be improved. For example, if the recognition success likelihood of the captured image using the finger print is between approximately 50% to 70%, the recognition success likelihood may be improved to approximately 60% or more.

On the other hand, based on failing in obtaining the content recognition information (525—N), the processor 110 of the electronic device 100 may be configured to record as the captured image being in an unrecognizable state (or, unknown state) (529).

FIG. 6 is a diagram illustrating a process of obtaining content recognition information according to another embodiment.

First, referring to FIG. 6, the processor 110 of the electronic device 100 may capture an image of a content (601).

The processor 110 of the electronic device 100 may be configured to determine whether the character area is included in the captured image (603).

Based on the determination result (or, identification result) of the character area, the processor 110 of the electronic device 100 may be configured to perform recognition of the captured image.

Based on failing in the identification of the captured area (603—N), the processor 110 of the electronic device 100 may be configured to extract the finger print from the captured image (605).

The processor 110 of the electronic device 100 may control the communicator 120 to transmit the extracted finger print to the server 200 (607). The server 200 may obtain the recognition result by performing recognition on the received finger print, and transmit the obtained recognition result to the electronic device 100 (609 to 613). The processor 110 of the electronic device 100 may, based on the received recognition result, store content recognition information matching the finger print in the memory 130 as viewing log information (615 to 617). The process of operations 607 to 617 corresponds to the process of operations 503 to 513 of FIG. 5 described above and redundant descriptions will be omitted. In operation 615, if recognition of finger print fails (615—N), the processor 110 of the electronic device 100 may be configured to record as the captured image being in an unrecognizable state (or, unknown state) (619).

In operation 603, based on the processor 110 determining whether the character area is included in the captured image, if the identification of the character area is a success (603—Y), the processor 110 of the electronic device 100 may be configured to recognize the character included in the identified character area (621).

The processor 110 of the electronic device 100 may be configured to control the communicator 120 to cause the recognized character to be transmitted to the server 200 (623).

The server 200 may be in a state having already recognized the target image or content to which the finger print is extracted from. The server 200 may confirm whether the captured image is scheduled as a finger print recognition target image based on the received character (625). The server 200 may transmit the confirmation result to the electronic device 100 (627).

The processor 110 of the electronic device 100 may, based on the received confirmation result, determine whether the captured image is a finger print recognition target (629).

Based on determining the captured image as the finger print recognition target (629—Y), the processor 110 may be configured to perform a process for recognizing the captured image by using the finger print. For example, the processor 110 may, as in operations 605 to 617 described above, extract a finger print from the captured image, and obtain the content recognition information matching the extracted finger print from the server 200 and store in the memory 130 as the viewing log information.

On the other hand, based on the captured image not being identified as the finger print recognition target (629—N), the processor 110 of the electronic device 100 may be configured to control the communicator 120 to cause the recognized character to be transmitted to the server 200 (631). Based on the character transmitted to the server 200 in operation 623 being in a continuously stored state, the process of operation 631 described above may be omitted.

The server 200 may perform a search of the image related information matching the character (633), and transmit the matching results of the character to the electronic device 100 (635). The processor 110 of the electronic device 100 may, based on the received matching result, determine whether obtaining of the content recognition information matching the character has failed or succeeded (637).

Based on succeeding in obtaining of the content recognition information (637—Y), the processor 110 of the electronic device 100 may be configured to control the memory 130 to cause the content recognition information matching the obtained character to be stored as the viewing log information of the user (639). On the other hand, based on failing in obtaining of the content recognition information (637—N), the processor 110 of the electronic device 100 may be configured to record in the memory 130 as the captured image being in an unrecognizable state (or, unknown state) (641).

According to various embodiments, in operation 625, based on the captured image being determined as the finger print recognition target image based on the character, the server 200 may transmit the matching result of the character to the electronic device 100 together with the finger print recognition target confirmation result.

According to an embodiment, because the image preemptively determined as not the recognition target of the finger print by the electronic device 100 omits the ACR function of recognizing the finger print, costs for using and maintaining the server 200 subject to performing ACR may be greatly reduced.

FIG. 7 is a diagram illustrating a process of obtaining content recognition information according to another embodiment.

Referring to FIG. 7, the process of obtaining content recognition information may be divided into a preemptive step which is a headend selection process and a following step which is an image recognition process. The headend may include a broadcasting company, a content source company, a communication company, a set-top manufacturing/managing company, or the like.

First, referring to FIG. 7, the processor 110 of the electronic device 100 may capture an image of a content (701).

The processor 110 of the electronic device 100 may be configured to identify a character area in the captured image (702).

The processor 110 of the electronic device 100 may be configured to recognize the character included in the identified character area (703).

The processor 110 of the electronic device 100 may be configured to control the communicator 120 to cause the recognized character to be transmitted to the server 200 (705).

The server 200 may perform a search of the image related information matching the received character (706). The server 200 may estimate a headend of the electronic device 100 based on a search of the image related information (707). For example, the server 200 may search the EPG database for the headend providing the character, and estimate the searched headend as a headend for providing content included with the captured image. The server 200 may also estimate a headend based on a plurality of characters. The server 200 may estimate the headend based on, for example, a rule-based method or an artificial intelligence-based method (e.g., deep learning, etc.). In addition, the server 200 may estimate a plurality of headend. The server 200 may transmit a headend list including one or more headend information to the electronic device 100 (709).

The electronic device 100 may, based on recognizing the captured image by using the finger print, search the headend estimated as providing the captured image included in the received headend list for image information matching the finger print. The electronic device 100 may extract the finger print from the captured image (711), and transmit the extracted finger print to the server 200 (713). The server 200 may perform recognition of the received finger print (715), and obtain the recognition result of the finger print (717). The server 200 may perform recognition of the finger print by limiting to a headend estimated as providing the captured image. The server 200 may then transmit the recognition result of the finger print to the electronic device 100 (719). According to another embodiment, the electronic device 100 may transmit the extracted finger print by limiting to a server related to the estimated headend.

When the finger print recognition result is received from the server 200, the electronic device 100 may store content recognition information matching the finger print according to the recognition results. Corresponding operations 721 and 725 correspond to operations 615 to 619 of FIG. 6 described above, and redundant descriptions thereof will be omitted.

According to various embodiments, when a fail message is received as the finger print recognition result, the electronic device 100 may recognize the captured image by transmitting the character (e.g., the character recognized in operation 703) recognized from the captured image to the server 200. The process corresponding thereto, may correspond to operations 519 to 529 of FIG. 5 described above.

According to an embodiment, the electronic device 100 may, because a preemptive selection of the headend providing a content source through character recognition is possible, minimally use the database required in the recognition of the captured image. That is, because the method of scheduling a broadcast for each headend may be different, based on the above described method, the electronic device 100 may recognize in advance as to which region the content source including the captured image is transmitted from, which broadcast company provided the content source including the captured image, and the like. Accordingly, because the search target of the content recognition information matching the finger print is limited by a specific region or a specific content source provider, the costs of using or managing the server may be greatly reduced.

Figure 8:
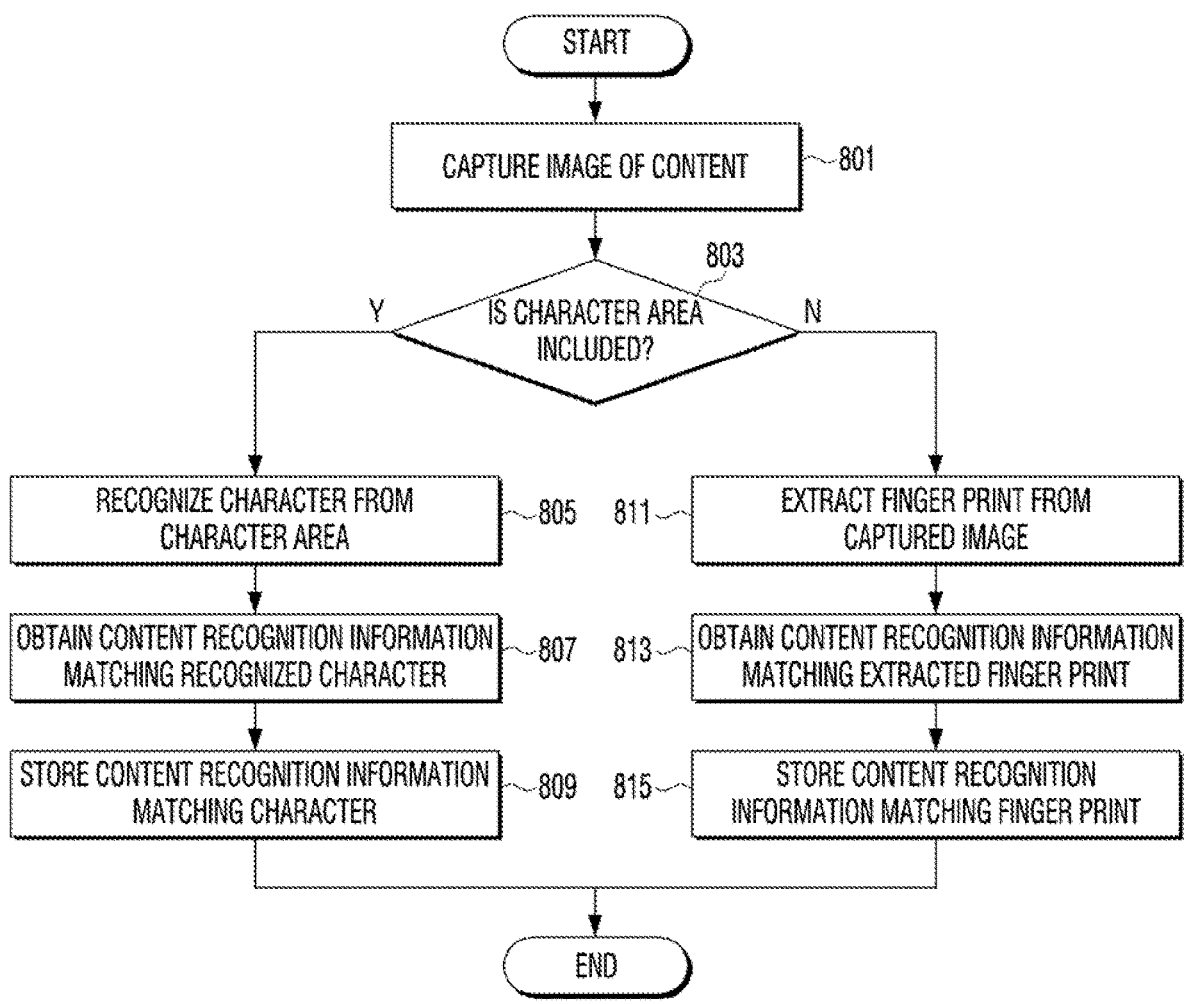
FIGS. 8 to 10 are flowcharts illustrating a process of obtaining content recognition information by an electronic device according to an embodiment of the disclosure.

FIG. 8 is a diagram illustrating a process of obtaining content recognition information according to an embodiment of the disclosure.

Referring to FIG. 8, the electronic device 100 may capture an image of a content (801).

The electronic device 100 may determine whether the character area is included in the captured image (803).

Based on the determination result (or, identification result) of the character area, the processor 110 of the electronic device 100 may be configured to perform recognition of the captured image.

Based on the electronic device 100 succeeding in identification of the character area included in the captured image (803—Y), the electronic device 100 may recognize the character from the character area (805). The electronic device 100 may obtain content recognition information matching the recognized character from the memory 130 or the server 200 (807). The electronic device 100 may store the content recognition information matching the obtained character as viewing log information of the user (809).

According to various embodiments, the electronic device 100 may, based on the confirmation results on whether the captured image is a finger print recognition target or not, obtain content recognition information matching the recognized character from the server 200. For example, based on the captured image being identified as not the finger print recognition target, the electronic device 100 may obtain content recognition information matching the recognized character from the server 200. On the other hand, based on the captured image being identified as the finger print recognition target, the electronic device 100 may extract the finger print from the captured image and obtain content recognition information matching the extracted finger print from the server.

Based on the determination result in operation 803, if the electronic device 100 fails in the identification of the character area included in the captured image (803—N), the electronic device 100 may extract the finger print from the captured image (811). The electronic device 100 may obtain the content recognition information matching the extracted finger print from the memory 130 or the server 200 (813). The electronic device 100 may store the content recognition information matching the extracted finger print as viewing log information of the user (815).

According to various embodiments, the electronic device 100 may transmit the stored content recognition information to an external analysis server (e.g., the analysis server of FIG. 1) that analyzes the viewing log of the user.

Figure 9:
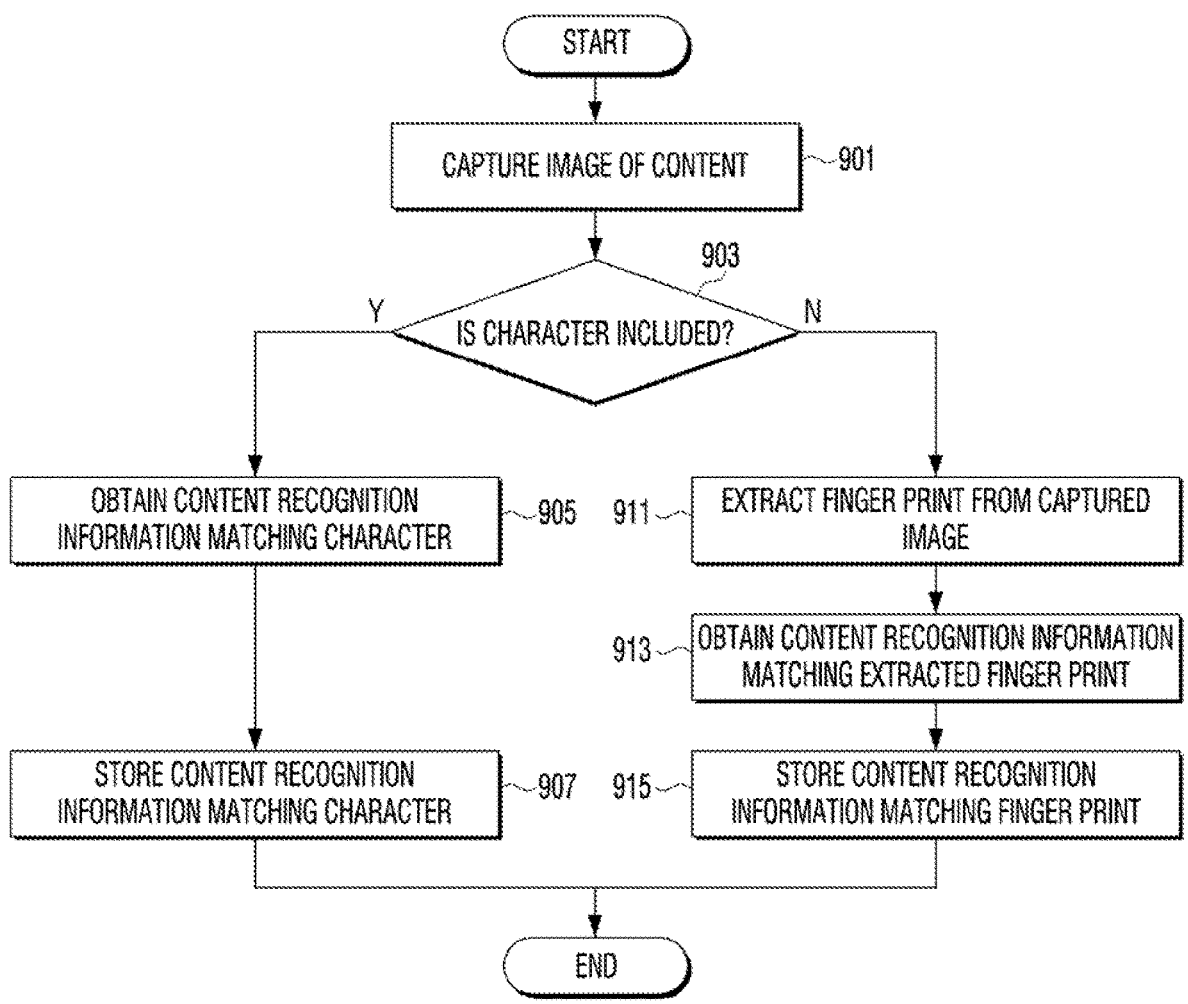

FIG. 9 is a diagram illustrating a process of obtaining content recognition information according to another embodiment.

Referring to FIG. 9, the electronic device 100 may capture an image of a content (901).

The electronic device 100 may determine whether a character is present in the captured image (903).

Based on the electronic device 100 succeeding in identification of the character included in the captured image (903—Y), the electronic device 100 may obtain content recognition information matching the character from the memory 130 or server 200 (905). The electronic device 100 may store the content recognition information matching the obtained character as the viewing log information of the user (907).

On the other hand, based on the electronic device 100 failing in the identification of the character included in the captured image, the electronic device 100 may extract the finger print from the captured image (911). The electronic device 100 may obtain the content recognition information matching the extracted finger print from the memory 130 or the server (913). The electronic device 100 may store the content recognition information matching the extracted finger print as the viewing log information of the user (915).

Figure 10:
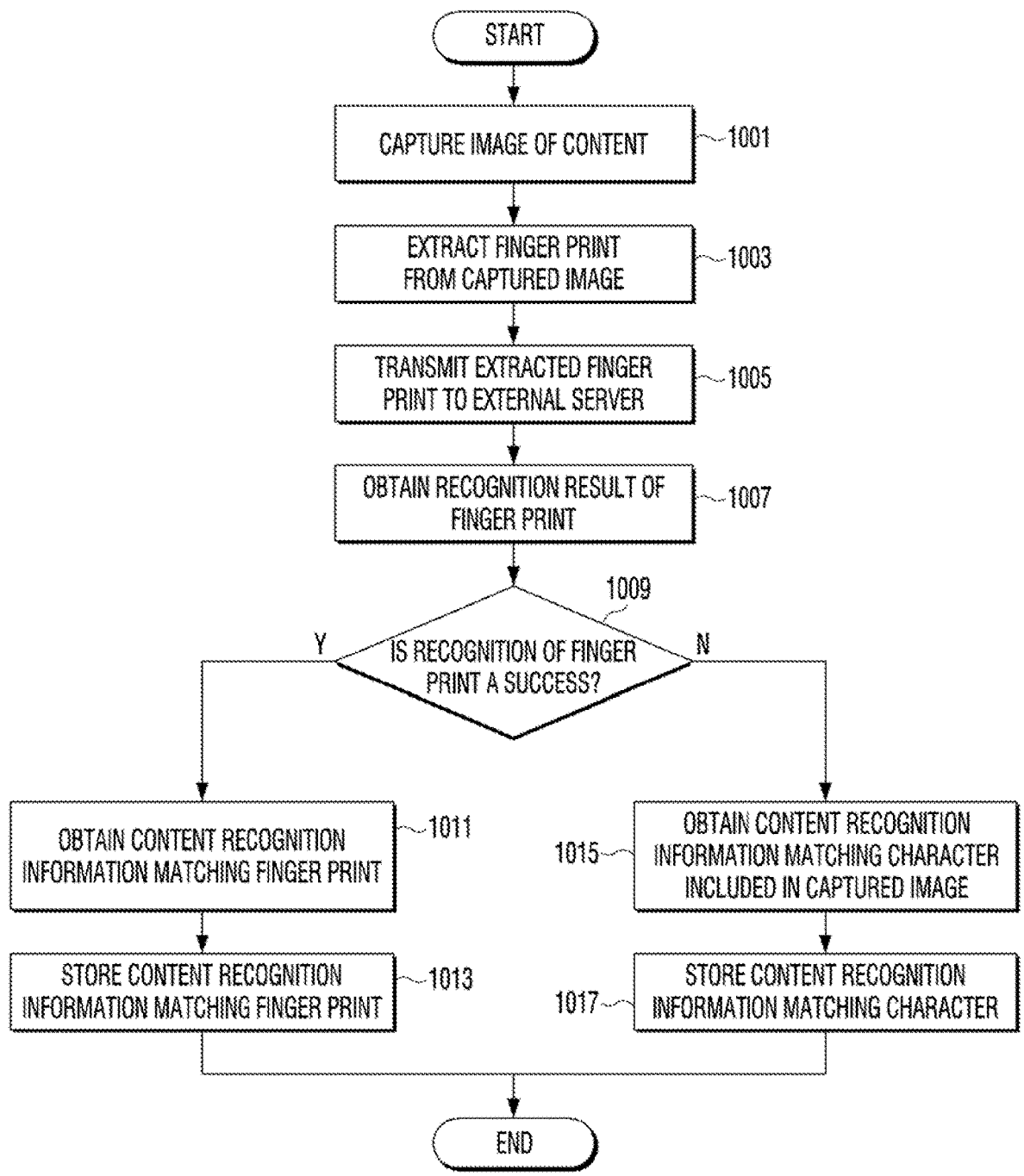

FIG. 10 is a diagram illustrating a process of obtaining content recognition information according to another embodiment.

Referring to FIG. 10, the electronic device 100 may capture an image of a content (1001).

The electronic device 100 may extract the finger print from the captured image (1003).

The electronic device 100 may transmit the extracted finger print to the server (1005).

The electronic device 100 may obtain the finger print recognition result from the server (1007).

The electronic device 100 may determine whether recognition of the finger print is a success or not from the finger print recognition result (1009).

Based on determination, if the recognition of finger print is identified as successful in the server 200 (1009—Y), the electronic device 100 may obtain the content recognition information matching the finger print from the memory 130 or the server 200 (1011). The electronic device 100 obtaining content recognition information matching the finger print may include extracting content recognition information matching the finger print from the recognition result obtained from the server 200. The electronic device 100 may store the content recognition information matching the finger print as the viewing log information of the user (1013).

Based on determination, if the recognition of the finger print is identified as failing in the server 200 (1009—N), the electronic device 100 may obtain the content recognition information matching the character included in the captured image from the memory 130 or the server 200 (1015). The identifying the recognition of the finger print as having failed in the server 200 may include the electronic device 100 receiving a fail message notifying failure of finger print recognition based on a finger print that is identical with or similar to the finger print in the server 200 not being found or image related information matching the searched finger print not being found. Then, the electronic device 100 may store the content recognition information matching the finger print as the viewing log information of the user (1017).

According to various embodiments, the electronic device 100 may transmit the stored content recognition information to an external analysis server (e.g., the analysis server of FIG. 1 (not shown)) that analyzes the viewing log of the user.

According to various embodiments, the server 100 that provides content recognition information matching the character may be a character matching server (e.g., the image related information server 230 of FIG. 1) included in the server 200. In addition, the server 200 that provides content recognition information matching the finger print may be a finger print matching server (e.g., the finger print matching server 210 of FIG. 1) included in the server 200.

According to various embodiments, the content recognition information may include metadata related to the captured image, storing address of the metadata, or the identifier of the metadata.

Figure 11:
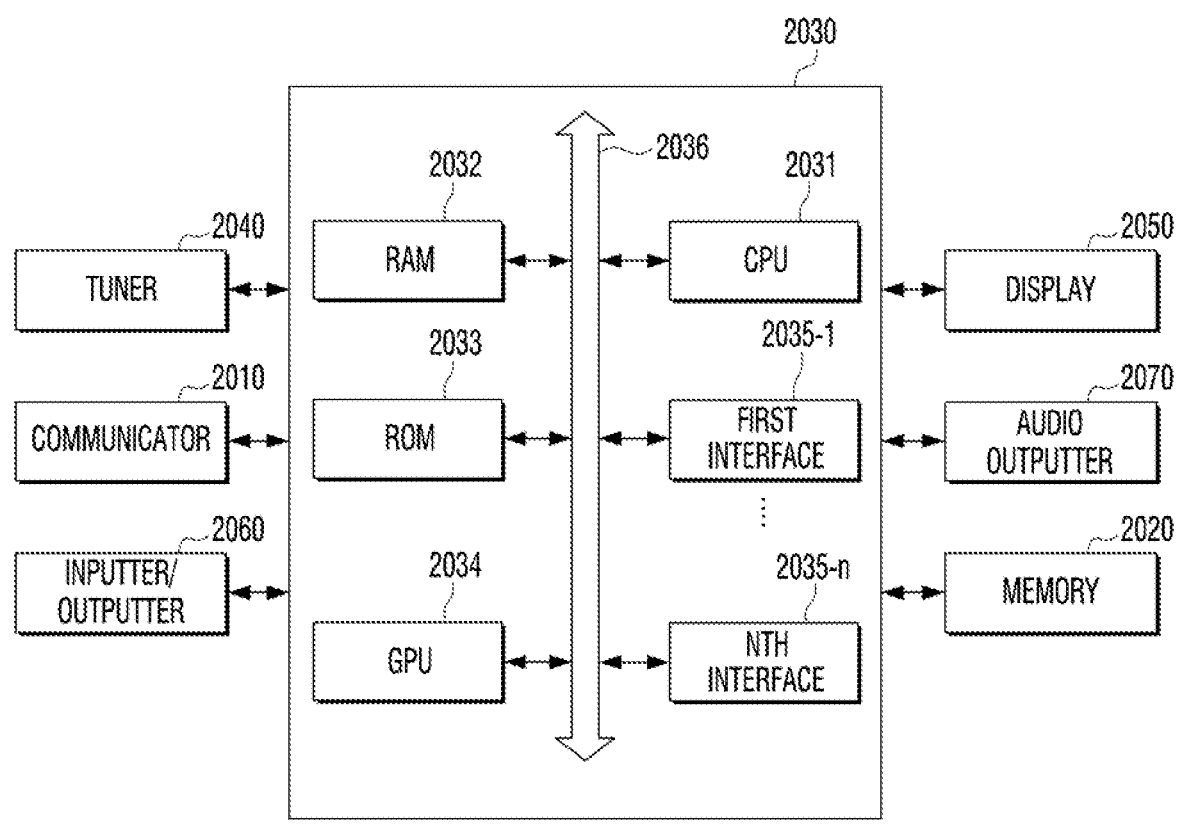
FIG. 11 is a block diagram of an electronic device according to an embodiment of the disclosure.

FIG. 11 is a block diagram of an electronic device 100 according to another embodiment of the disclosure.

Referring to FIG. 11, the electronic device 100 may include a communicator 2010, a memory 2120, a processor 2030, a tuner 2040, a display 2050, an inputter/outputter 2060, and an audio outputter 2070. Some of the configurations may be omitted based on the embodiment, and although not illustrated, hardware/software configurations appropriate to a level which would be obvious to those of ordinary skill in the art may be additionally included in the electronic device 100.

The communicator 2010 may be a configuration for performing communication with the external device. For the description on the communicator 2010 illustrated in FIG. 11, the description on the communicator 120 described with reference to FIG. 2 may be referenced.

The memory 2020 may be configured to store various data and an operating system (O/S) for driving and controlling the electronic device 100. For the description on the memory 2020 illustrated in FIG. 11, the description on the memory 130 described with reference to FIG. 2 may be referenced.

The tuner 2040 may tune and select only a frequency of a channel that the electronic device 100 is to receive from among the many radio wave components through amplification, mixing, resonance, and the like with respect to a broadcast signal received in a wired or wireless manner.

The tuner 2040 may receive the broadcast signal which includes a video, an audio and additional data in a frequency band corresponding to the channel selected by the user.

The tuner 2040 may receive the broadcast signal from various sources such as a terrestrial broadcast, a cable broadcast, a satellite broadcast, or the like. The tuner 2040 may receive the broadcast signal from sources such as an analog broadcast, a digital broadcast, or the like.

The broadcast signal received through the tuner 2040 may include metadata, which is information related to a video data, an audio data, and a program related data. The metadata may include additional information on the broadcast program, information on, for example, a program name, a synopsis, a start time of the broadcast, an end time on the broadcast, and the like. The metadata which is information related to the broadcast program may be received through not only the tuner 2040 but also through a communicator 2010 from an internet server.

The tuner 2040 may be implemented as an all-in-one with the electronic device 100 or as a separate device (e.g., inputter/outputter 2060 or a tuner coupled to the communicator 2010) electrically coupled with the electronic device 100.

The display 2050 may be a configuration for displaying an image, and may output, for example, video data with the broadcast signal received through the tuner 2040 included, an image input through the communicator 2010 or the inputter/outputter 2060, or the image included in the image file stored in the memory 2020.

The display 2020 may be implemented as, for example, a liquid crystal display (LCD), and in some cases, may be implemented as a cathode-ray tube (CRT), a plasma display panel (PDP), an organic light emitting diodes (OLED), a transparent OLED (TOLED), or the like. In addition, the display 2050 may also be implemented in a touch screen form capable of detecting touch manipulation of the user.

The audio outputter 2070 may be a configuration for outputting audio, and may output, for example, an audio included in the broadcast signal received through the tuner 2040, an audio input through the communicator 2010 or the inputter/outputter 2060, or an audio included in an audio file stored in the memory 2020. The audio outputter 2070 may include a speaker and/or headphone output socket.

The inputter/outputter 2060 may be a configuration for coupling with an external device, and may include, for example, a high-definition multimedia interface (HDMI) input port, a component input jack, a USB port, or the like, and may include at least one from among the ports such as a RGB, DVI, DP, Thunderbolt, or the like.

The processor 2030 may control the overall operation of the electronic device 100. For the description on the processor 2030 illustrated in FIG. 11, the description on the processor 110 described with reference to FIG. 2 may be referenced.

The processor 2030 may include a RAM 2032, a ROM 2033, a GPU 2034, a CPU 2031, a first to nth interface 2035-1 to 2035-N, and a bus 2036. The RAM 2032, the ROM 2033, the GPU 2034, the CPU 2031, the first to nth interface 2035-1 to 2035-N, and the like may be intercoupled through the bus 2036.

The ROM 2033 may be stored with a set of instructions, and the like for performing system booting. Based on power being supplied due to a turn-on instruction on the electronic device 100 being input, the CPU 2031 may copy at least some of the O/S stored in the memory 2020 to the RAM 2032 according to the instructions stored in the ROM 2033, and boot the system by executing the O/S. When booting is completed, the CPU 2031 may copy the various programs stored in the memory 200 to the RAM 2032, and perform various operations by executing the programs copied to the RAM 2032. The CPU 2031 may perform various operations by using various program modules, data, and the like stored in the memory 2020.

The GPU 2034 may display an image when booting of the electronic device 100 is completed. The GPU 2034 may generate a screen including various objects such as an icon, an image, a text, and the like by using a calculating part and a rendering part. The calculating part may calculate an attribute value such as a coordinate value, form, size, color, or the like for each object to be displayed according to a layout of the screen. The rendering part may generate a screen of various layouts including objects based on the attribute value calculated in the calculating part. The screen generated in the rendering part may be provided to the display 2050, and displayed within a display area.

The first to nth interface 2035-1 to 2035-N may be coupled with the various elements 2010, 2020, and 2040 to 2070 described above. The one from among the interfaces may be a network interface that is coupled with the external device through a network.

According to an embodiment, the processor 2030 may capture an image of a content. The processor 2030 may, based on the identification result of the character area included in the captured image, recognize the character from the character area and obtain content recognition information matching the recognized character from the server 200 through the communicator 2010. Alternatively, the processor 2030 may, based on the identification result of the character area included in the captured image, extract the finger print from the captured image and obtain content recognition information matching the extracted finger print from the server 200. The processor 2030 may store at least one from among the content recognition information matching the obtained character and the content recognition information matching the finger print in the memory 2020.

Figure 12:
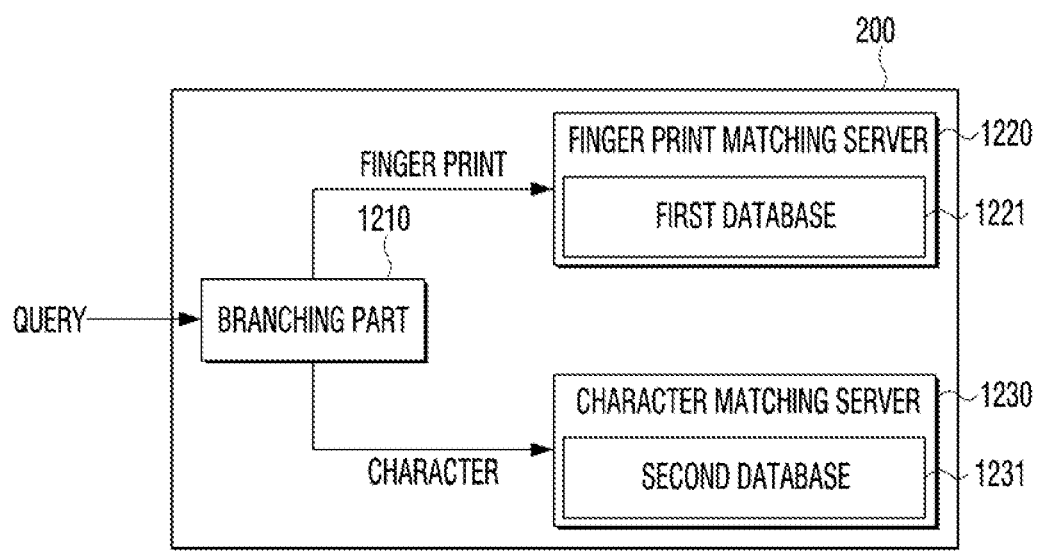
FIG. 12 is a block diagram of a server including a branching part according to an embodiment of the disclosure.

FIG. 12 is a block diagram of a server including a branching part according to an embodiment of the disclosure.

Referring to FIG. 12, the server 200 may include a branching part 1210, a finger print matching server 1220, and a character matching server 1230. The finger print matching server 1220 may, as a server for providing the finger print recognition results, include the finger print matching server 210 of FIG. 2 described above. The character matching server 1230 may, as a server for proving the character matching results, may include the image related information server 230 (e.g., an EPG server, a metadata dedicated server) of FIG. 2 described above.

The branching part 1210 may, as at least a part of a processor of the server 200, transfer a query related to the content received from the electronic device 100 to a server suitable for use. The branching part 1210 may, based on the finger print being included in the query received from the electronic device 100, transmit the finger print to the finger print matching server 1220. On the other hand, based on the character being included in the query received from the electronic device 100, the branching part 1210 may transmit the character to the character matching server 1230.

Alternatively, based on a field related to a destination being included in the query received from the electronic device 100, the branching part 1210 may transmit at least a part of the received query to the finger print matching server 1220 or the character matching server 1230 according to the field value.

Based on the finger print matching server 1220 receiving the finger print from the branching part 1210, the finger print matching server 1220 may search for information related to the first image matching the finger print in a first database (DB) 1221. The first database (DB) 1221 may include at least one from among, for example, a live content database (DB), a VOD content database (DB), a DVR content database (DB), or a custom content database (DB) described above in FIG. 5. The first database 1221 may be included with information related to a plurality of first images corresponding t each of the plurality of finger prints. The information related to the first image may include information related to a broadcast program such as, for example, and without limitation, the name of the broadcast program, the genre of the broadcast program, and the like. When information related to the first image matching the finger print is searched in the finger print matching server 1220, the server 200 may transmit information related to the searched first image to the electronic device 100 as content recognition information related to the content.

Based on the character matching server 1230 receiving the character from the branching part 1210, the character matching server 1230 may search for the second image related information matching the character in the second database (DB) 1231. The second database (DB) 1231 may include, for example, the EPG database. In the second database 1231, a plurality of second image related information corresponding to each of the plurality of characters may be included. The second image related information may include, for example, EPG information. The character matching server 1230 may, based on the second image related information matching the character being found, transmit the searched second image related information to the electronic device 100 as content recognition information related to the content.

Figure 13:
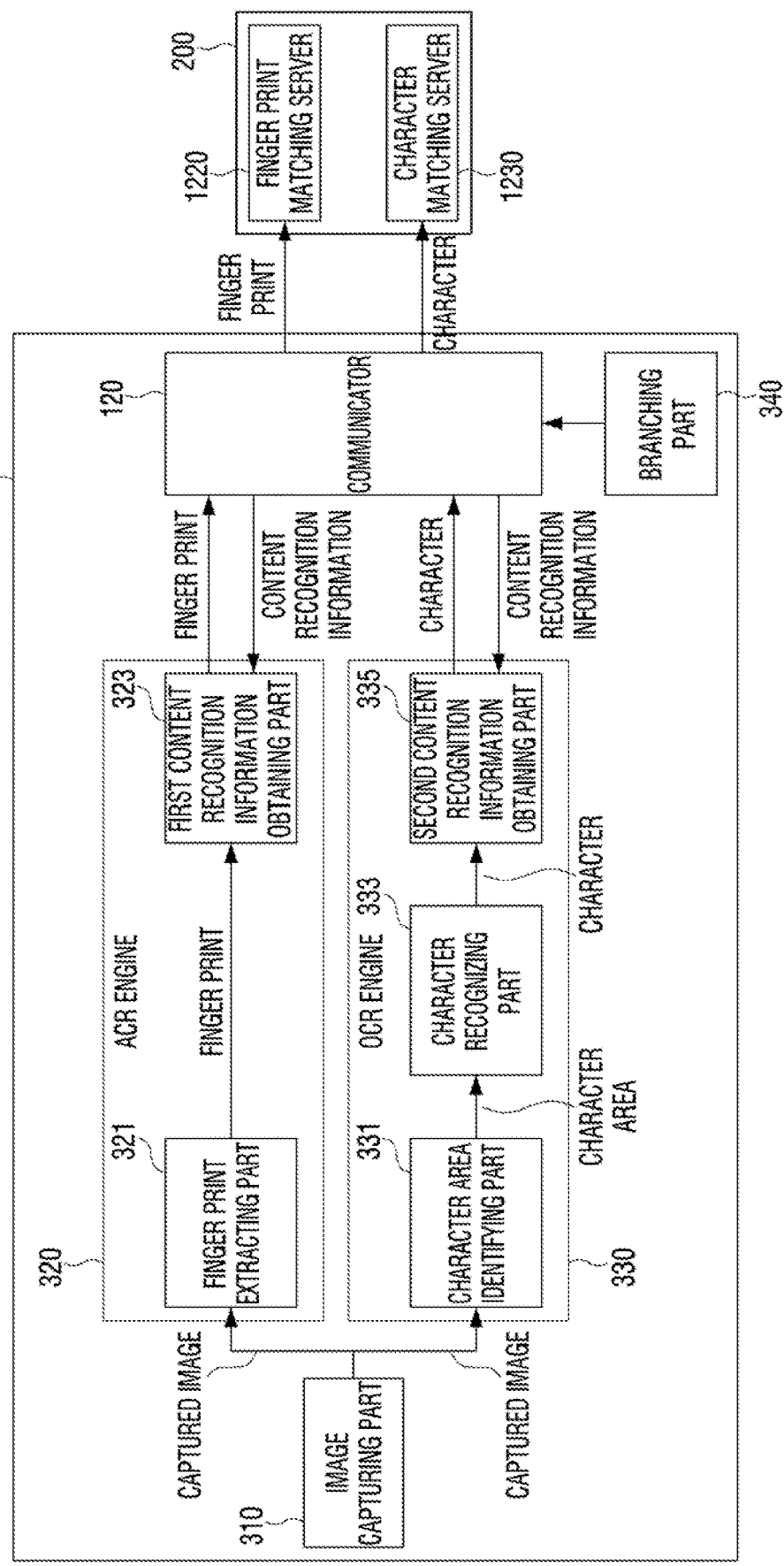
FIG. 13 is a block diagram of an electronic device including a branching part according to an embodiment of the disclosure.

FIG. 13 is a block diagram of an electronic device including a branching part according to an embodiment of the disclosure.

Referring to FIG. 13, the electronic device 100 may include an image capturing part 310, an ACR engine 320, an OCR engine 330, and a branching part 340. Of the above, the image capturing part 310, the ACR engine 320, and the OCR engine 330 each correspond to the image capturing part 310, the ACR engine 320, and the OCR engine 330 of FIG. 3 described above, and thus redundant descriptions thereof will be omitted.

The branching part 340 may either obtain the finger print extracted from the captured image from the ACR engine 320, or obtain the character recognized from the character area from the OCR engine 330. The branching part 340 may determine a server for the obtained finger print or the character to be transmitted. The branching part 340 may, based on the finger print being obtained, control the communicator 120 to transmit the query including the obtained finger print to the finger print matching server 1220. On the other hand, the branching part 340 may, based on the character being obtained, control the communicator 120 to transmit the query including the obtained character to the character matching server 1230.

Based on the control result of the branching part 340, the electronic device 100 may receive the content recognition information matching the finger print or the character through the communicator 120.

Figure 14:
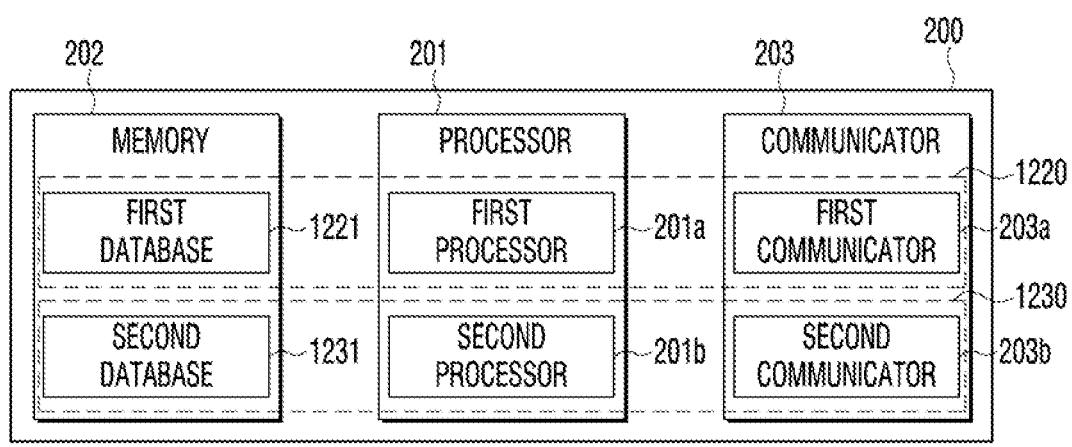
FIG. 14 is a block diagram of a server according to an embodiment of the disclosure.

FIG. 14 is a block diagram of a server according to an embodiment of the disclosure.

Referring to FIG. 14, the server 200 may include at least one processor 201, at least one memory 202, and at least one communicator 203.

The at least one processor 201 may be comprised of a first processor 201A and a second processor 201B. For example, based on the server 200 being comprised of a plurality of sub servers (e.g., the finger print matching server and the character matching server), the first processor 201A may be a processor of the finger print matching server, and the second processor 201B may be a processor of the character matching server. The first processor 201A and the second processor 201B may be generated into a single chip or into a plurality of chips present at a position spaced apart from one another, and may communicate with one another through a wired or wireless network.

The at least one processor 201 may control the overall operation of the server 200. For example, the at least one processor 201 may control a plurality of hardware or software elements coupled to the at least one processor 201 by driving the O/S or application program, and perform various data processor and calculations.

According to various embodiments, the at least one processor 201 may be configured to control the at least one communicator 203 to receive a query related to the content being viewed by the user from the electronic device 100. Based on the finger print being included in the received query, the at least one processor 201 may be configured to search for the first image related information matching the finger print in the first database 1221 included in the at least one memory 202. On the other hand, based on the character being included in the received query, the at least one processor 201 may search for the second image related information matching the character in the second database 1231.

The at least one memory 202 may be accessed by the at least one processor 201, and reading/writing/modifying/deleting/updating and the like of data may be performed by the at least one processor 201. The at least one memory 202 may be comprised of a plurality of sub memories. For example, based on the server 200 being comprised of a plurality of sub servers (e.g., the finger print matching server and the character matching server), the memory 202 may be configured to include both the memory of the finger print matching server and the memory of the processor of the character matching server. The sub memories may be generated into a single memory, and may be configured to a plurality of memories present at a position spaced apart from one another.

The at least one memory 202 may include the first database 1221 and the second database 1231. In an example, the first database 1221 may be included in the memory of the finger print matching server, and the second database 1231 may be included in the memory of processor of the character matching server.

According to various embodiments, the at least one memory 202 may be configured to control the at least one communicator 203 to cause the at least one processor 201 to receive a query related to the content being viewed by the user from the electronic device 100, and based on the finger print being included in the received query, search for the first image related information matching the finger print in the first database included in the memory 202, and based on the character being included in the received query, store instructions set to search for the second image related information matching the character in the second database.

The at least one communicator 203 may be comprised of a first communicator 203A and a second communicator 203B. For example, based on the server 200 being comprised of a plurality of sub servers (e.g., the finger print matching server and the character matching server), the first communicator 203A may be a communicator of the first print matching server, and the second communicator 203B may be a communicator of the character matching server. The at least one communicator 203 may communicate with the external device (e.g., electronic device 100) by being coupled to a network through a wireless communication. For example, the at least one communicator 203 may communicate with the external device through a short range communication network (e.g., Bluetooth, Wi-Fi direct, or infrared data association (IrDA), etc.) or a long range communication network (e.g., cellular network, internet, or computer network (e.g., local area network (LAN) or wide area network (WAN), etc.) by using a wireless communication module (e.g., a cellular communication module, a near field communication module, or a global navigation satellite system (GNSS) communication module).

FIG. 15 is a flowchart of a server according to an embodiment of the disclosure.

Referring to FIG. 15, the server 200 may receive a query related to the content being viewed by the user from the electronic device 100 (1501).

Based on the query being received, the server 200 may identify information included in the query (1502). For example, the server 200 may identify whether the finger print is included in the query or the character is included therein.

Based on the finger print being included in the received query (1502-A), the server 200 may search for the first image related information matching the finger print in the first database (1503). The first database may, for example, be a database included in the memory of the finger print matching server.

On the other hand, based on the character being included in the received query (1502-B), the server 200 may search for the second image related information matching the character in the second database (1504).

The first image related information or the second image related information is searched, the server 200 may transmit the first image related information or the second image related information to the electronic device 100 as a content recognition information (1505).

According to the above-described embodiments, because the frequency of transmitting requests including characteristic information for content recognition may be reduced, there is the advantage of reducing query costs.

The various embodiments described above may be implemented as a software, a hardware, or a combination thereof. According to a hardware implementation, the embodiments described herein may be implemented by using at least one from among, for example, and without limitation, application specific integrated circuits (ASICs), digital signal processor (DSPs), digital signal processing devices (DSPDs), programmable logic devices (PLDs), field programmable gate arrays (FPGAs), processors, controllers, micro-controllers, microprocessors, and electrical units for performing other functions. According to a software implementation, the embodiments such as procedures and functions described herein may be implemented to separate software modules. The software modules may perform one or more functions and operations described in the disclosure.

One or more embodiments may be implemented with software including instructions stored in a machine-readable storage media (e.g., computer). The machine may call an instruction stored in the storage medium, and as a device capable of operating according to the called instruction, may include an electronic device 100 according to embodiments. Based on the instruction being executed by the processor, the processor may directly or under the control of the processor perform a function corresponding to the instruction using different elements. The instructions may include a code generated by a compiler or executed by an interpreter. The machine-readable storage media may be provided in the form of a non-transitory storage medium. Herein, "non-transitory" merely means that the storage medium is tangible and does not include a signal and does not distinguish that data is permanently or temporarily stored in the storage medium.

According to an embodiment, a method according to one or more embodiments may be provided in a computer program product. The computer program product may be exchanged between a seller and a purchaser as a commodity. The computer program product may be distributed in the form of a machine-readable storage medium (e.g., a compact disc read only memory (CD-ROM)) or distributed online through an application store (e.g., PLAYSTORE™). In the case of online distribution, at least a portion of the computer program product may be at least stored temporarily in a storage medium such as a manufacturer's server, a server of an application store, or a memory of a relay server, or temporarily generated.

According to an embodiment, a computer program product may include instructions set to cause a processor of the computer to perform a control operation to capture an image of a content, and based on an identification result of a character area included in a captured image, a control operation to recognize a character from the character area and obtain content recognition information matching the recognized character from the server or a control operation to extract a finger print from the captured image and obtain content recognition information matching the extracted finger print from the server 200, and a control operation to store at least one from among the content recognition information matching the obtained character and the content recognition information matching the finger print.

Each of the elements (e.g., a module or a program) according to various embodiments may be comprised of a single entity or a plurality of entities, and some sub-elements of the abovementioned sub-elements may be omitted, or different sub-elements may be further included According to various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order, omitted or a different operation may be added.

While the disclosure has been illustrated and described with reference to the embodiments thereof, the disclosure is not limited to the embodiments described. It will be understood by those skilled in the art that various changes in form and details may be made therein without departing from the spirit and scope of the disclosure.

What is claimed is:

1. An electronic device, comprising:
a communicator capable of communicating with a server;
a memory configured to store instructions; and at least one processor electrically coupled with the communicator and the memory,
wherein the memory is configured to, based on executing the electronic device, store instructions set to cause the at least one processor to:
capture an image of a content;
identify whether a character area is included in the captured image;
based on identifying that the character area is included in the captured image, identify a character included in the character area, transmit information regarding the identified character to a first server, and receive content recognition information matching the identified character from the first server through the communicator;
based on identifying that the character area is not included in the captured image, extract a finger print from the captured image, transmit information regarding the extracted finger print to a second server, and receive content recognition information matching the extracted finger print from the second server through the communicator; and
store at least one from among the content recognition information matching the identified character and the content recognition information matching the finger print in the memory.

2. The electronic device of claim 1, wherein the memory is configured to, based on the electronic device being executed, store instructions set to cause the processor to, based on the captured image not being a finger print recognition target, receive content recognition information matching the identified character from the first server through the communicator.

3. The electronic device of claim 2, wherein the memory is configured to, based on the electronic device being executed, store instructions set to cause the processor to, transmit the identified character to the first server, and based on the captured image not being identified as the finger print recognition target based on the transmitted character, receive content recognition information matching the identified character from the first server through the communicator.

4. The electronic device of claim 1, wherein the memory is configured to, based on the electronic device being executed, store instructions set to cause the processor to, transmit the stored content recognition information to an external analysis server that analyzes a viewing log of a user through the communicator.

5. The electronic device of claim 1, wherein each of the content recognition information matching the identified character and the content recognition information matching the extracted finger print comprises a metadata related to the captured image, a storing address of the metadata, or an identifier of the metadata.

6. The electronic device of claim 1, wherein the memory is configured to, based on the electronic device being executed, store instructions set to cause the processor to, identify a type of the content, and based on the identified type of the content, extract a finger print from the captured image and receive content recognition information matching the extracted finger print from the second server through the communicator regardless of whether the character area is identified.

7. A method of obtaining content recognition information, comprising:
capturing an image of a content;
identifying whether a character area is included in the captured image;
based on identifying that a character area is included in the captured image, identifying a character included in the character area, transmitting information regarding the identified character to a first server and receiving content recognition information matching the identified character from the first server;
based on identifying that the character area is not included in the captured image, extracting a finger print from the captured image, transmitting information regarding the extracted finger print to a second server and receiving content recognition information matching the extracted finger print from the second server; and
storing at least one from among the content recognition information matching the identified character and the content recognition information matching the finger print.

8. The method of claim 7, wherein the receiving of content recognition information matching the identified character from the first server comprises,
based on the captured image not being a finger print recognition target, receiving content recognition information matching the identified character from the first server.

9. The method of claim 8, wherein based on the captured image not being a finger print recognition target, receiving content recognition information matching the identified character from the first server, comprises:
transmitting the identified character to the first server; and
based on the captured image not being identified as the finger print recognition target based on the transmitted character, receiving content recognition information matching the identified character from the first server.

10. The method of claim 7, wherein the method further comprises:
transmitting the stored content recognition information to an external analysis server that analyzes a viewing log of a user.

11. The method of claim 7, wherein the first server which provides content recognition information matching the identified character is a character matching server comprised in the server, and
wherein the second server which provides content recognition information matching the extracted finger print is a finger print matching server comprised in the server.

12. The method of claim 7, wherein the content recognition information comprises a metadata related to the captured image, a storing address of the metadata, or an identifier of the metadata.

13. The method of claim 7, further comprising:
based on a character area being identified in the captured image, transmitting the identified character to a character matching server; and
based on a character area not being identified in the captured image, transmitting the extracted finger print to a finger print matching server.

* * * * *